US012463873B2

(12) United States Patent
Sethi et al.

(10) Patent No.: US 12,463,873 B2
(45) Date of Patent: Nov. 4, 2025

(54) SYSTEM AND METHOD FOR MINIMIZING CO2 EMISSIONS WITH GEOGRAPHIC PLACEMENT OF INTERNET OF THINGS (IOT) DEVICE WITH RESPECT TO DATA GEOLOCATIONS FOR IOT DATA GATHERING

(71) Applicant: Dell Products, LP, Round Rock, TX (US)

(72) Inventors: Parminder Singh Sethi, Punjab (IN); Deeder M. Aurongzeb, Austin, TX (US); Malathi Ramakrishnan, Tamil Nadu (IN)

(73) Assignee: DELL PRODUCTS LP, Round Rock, TX (US)

( * ) Notice: Subject to any disclaimer, the term of this patent is extended or adjusted under 35 U.S.C. 154(b) by 198 days.

(21) Appl. No.: 18/142,422

(22) Filed: May 2, 2023

(65) Prior Publication Data

US 2024/0372784 A1 Nov. 7, 2024

(51) Int. Cl.
*H04L 41/12* (2022.01)
*G06Q 10/0637* (2023.01)
*H04L 41/14* (2022.01)

(52) U.S. Cl.
CPC ........ *H04L 41/12* (2013.01); *G06Q 10/0637* (2013.01); *H04L 41/14* (2013.01)

(58) Field of Classification Search
CPC ...... H04L 41/12; H04L 41/14; G06Q 10/0637
See application file for complete search history.

(56) References Cited

U.S. PATENT DOCUMENTS

| 7,468,661 | B2 | 12/2008 | Petite |
| 7,715,951 | B2 | 5/2010 | Forbes, Jr. |
| 7,742,830 | B1* | 6/2010 | Botes ............ G06F 9/4893 |
| | | | 700/32 |
| 8,013,732 | B2 | 9/2011 | Petite |
| 8,626,450 | B2 | 1/2014 | Dooley |
| 9,014,996 | B2 | 4/2015 | Kamel |
| 9,571,582 | B2 | 2/2017 | Petite |

(Continued)

FOREIGN PATENT DOCUMENTS

WO 2011/106160 A2 9/2011

*Primary Examiner* — Lance Leonard Barry
(74) *Attorney, Agent, or Firm* — Prol Intellectual Property Law, PLLC; H. Kenneth Prol

(57) ABSTRACT

An Internet of Things (IoT) edge gateway device information handling system executing an IoT edge gateway device location optimization and carbon dioxide ($CO_2$) minimization system may comprise a network interface device receiving, at an edge gateway initial location, power consumption analytics and locations of AP IoT servers transceiving IoT data with the IoT edge gateway in an enterprise wireless area network (WAN), a processor executing code instructions to determine an optimal location for the IoT edge gateway that reduces total estimated $CO_2$ emissions during IoT data transmission between the AP IoT servers and the IoT edge gateway, based on the power consumption analytics and current locations of the AP IoT servers to a new optimal location in the enterprise WAN, and the network interface device transmitting an instruction to physically move the IoT edge gateway to the optimal geographic location to minimize $CO_2$ emitted during transceiving of the IoT data.

20 Claims, 8 Drawing Sheets

(56) References Cited

U.S. PATENT DOCUMENTS

| | | |
|---|---|---|
| 2007/0260417 A1* | 11/2007 | Starmer ................ G01K 7/425 |
| | | 374/E7.043 |
| 2009/0292617 A1 | 11/2009 | Sperling |
| 2010/0070404 A1 | 3/2010 | McConnell |
| 2013/0066477 A1 | 3/2013 | Jiang |
| 2014/0100937 A1 | 4/2014 | Na |
| 2014/0316964 A1 | 10/2014 | Slutsker |
| 2016/0334824 A1 | 11/2016 | Forbes, Jr. |
| 2024/0201675 A1* | 6/2024 | Copperthite ..... G05B 19/41885 |

* cited by examiner

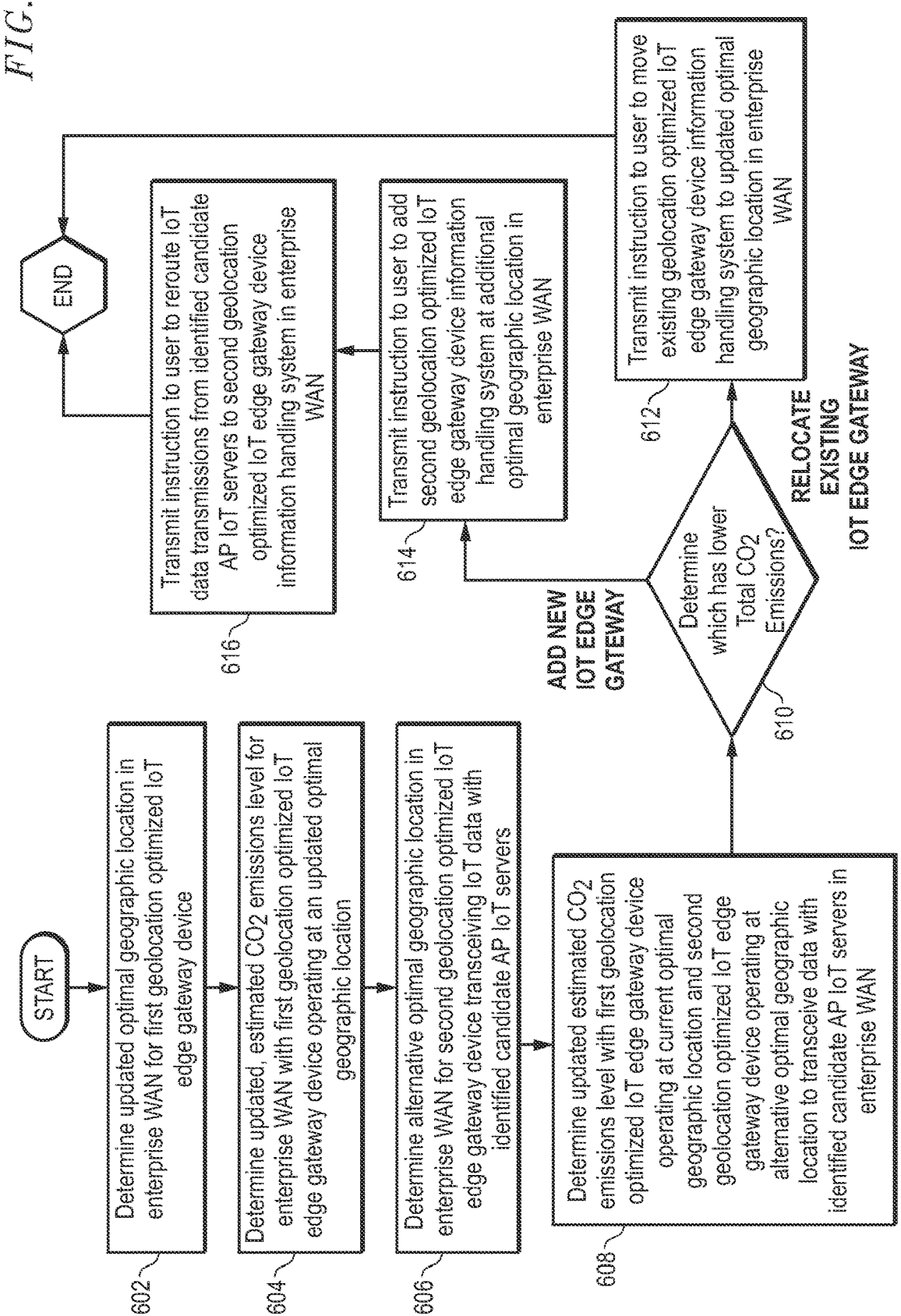

SYSTEM AND METHOD FOR MINIMIZING CO2 EMISSIONS WITH GEOGRAPHIC PLACEMENT OF INTERNET OF THINGS (IOT) DEVICE WITH RESPECT TO DATA GEOLOCATIONS FOR IOT DATA GATHERING

FIELD OF THE DISCLOSURE

The present disclosure generally relates to minimizing an amount of greenhouse gas emissions that may be attributable to transceiving of Internet of Things (IoT) data between Access Point (AP) IoT servers for a plurality of IoT sensors or devices and IoT edge gateway devices that communicate with backend cloud applications. More specifically, the present disclosure relates to an IoT edge gateway device location optimization and CO2 minimization system for identifying an optimal geographic location for one or more IoT edge gateway devices so as to minimize CO2 emissions due to power consumed during transceiving of IoT data between the one or more edge IoT gateway devices and operably connected AP IoT servers.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise IoT data storage, or global communications. In addition, information handling systems may include a variety of hardware and software components that may be configured to process, store, and communicate information and may include one or more computer systems, data storage systems, data centers, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 6 is a flow diagram illustrating a method of determining a second optimal geographic location for placement of a second IoT edge gateway device receiving IoT data from a plurality of AP IoT servers identified as potentially causing a detected increase in total CO2 emissions according to an embodiment of the present disclosure.

The use of the same reference symbols in different drawings may indicate similar or identical items.

DETAILED DESCRIPTION OF THE DRAWINGS

Figure 1:
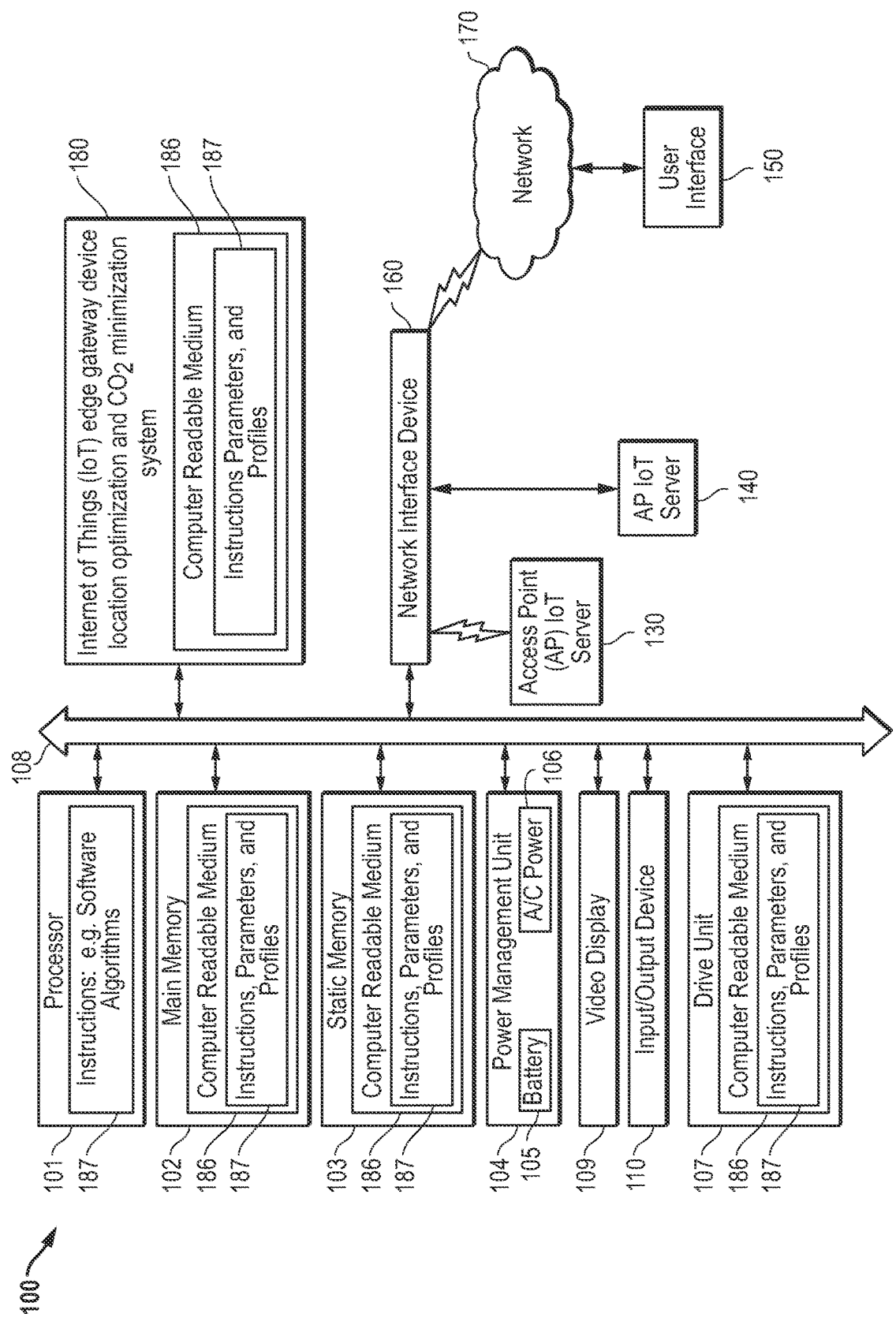
FIG. 1 is a block diagram illustrating an Internet of Things (IoT) edge gateway device information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever increasing value on minimizing greenhouse gas (GHG) emissions generated during manufacture and usage of products they purchase. In other words, the amount of GHG emissions generated during manufacture or use of a product is projected to sway an end consumer's purchasing decision to an increasingly large degree over the coming years. Further, such emissions may also influence a cloud computing customer's selection of cloud-based computing resources, including Internet of Things (IoT) sensors, Access Point (AP) IoT servers, and IoT edge gateway devices operating within a single enterprise-operated wide area network (WAN), or a network operated by a mobile network operator (MNO), virtual network operator (MVNO), MVNO enhanced service provider (MVNO-E), or full MVNO.

In embodiments of the present disclosure, each AP IoT server may communicate with a plurality of IoT sensors within a low-power wide area network (LPWAN) in accordance with the 3GPP narrow band (NB) IoT data transmission standard (NB-IoT). Each AP IoT server may also communicate upstream with an IoT edge gateway device within an enterprise WAN, which may be a network operated by an MNO, an MVNO, an MVNO-E, a full MVNO. The enterprise that operates the WAN, MNO, MVNO, MVNO-E or full MVNO may own or rent specific frequency ranges within existing cellular network frequency bands at which only the MNO, MVNO, or operator of the WAN may transmit IoT sensor data or any other signals.

This linked network infrastructure may enable IoT sensor devices to transmit IoT sensor data to the cloud using low bandwidth signals via existing mobile carrier networks operated by MNOs over potentially large distance ranges (e.g., akin to the wide area network (WAN) design of cellular technologies such as Global System for Mobile Communications (GSM) and Long Term Evolution (LTE)). In order to cover potentially large areas while ensuring low power consumption of IoT sensors, this linked network infrastructure and the NB-IoT standard employ a new physical layer with signals and channels to meet the requirements of extended coverage in rural areas and deep indoors, while enabling very low IoT sensor device complexity. For example, in order to cover a potentially large area, or long distance between any given IoT sensor and an IoT edge gateway device information handling system having access to the public internet (for transmission of IoT sensor data to a cloud application or platform), one AP IoT server may be placed nearby a plurality of IoT sensors to act as an intermediate gateway between the IoT sensors and the IoT edge gateway device having public internet access to the cloud platform. These one or more AP IoT servers at one or more enterprise facilities may be linked to the IoT edge gateway device via the enterprise controlled WAN.

GHGs emitted by IoT data transmission connections between such a plurality of AP IoT servers and any one of such IoT edge gateway devices within an enterprise WAN may be dependent upon power consumed during transceiving of IoT data between the plurality of AP IoT servers and the IoT edge gateway device, which may in turn be dependent on the IoT data transfer rates (Gb/s) within Quality of Service (QOS) requirements for each of the AP IoT servers, the geographic locations of the AP IoT servers and the IoT edge gateway device (e.g., distances between them and number of intermediate hops or types of wired or wireless transmissions), and the volume of IT data transceived. A solution is needed to minimize the total $CO_2$ emitted during such IoT data transfer between a plurality of AP IoT servers and at least one IoT edge gateway device.

A hardware processor of an IoT edge gateway device executing code instructions of the IoT edge gateway device location optimization and $CO_2$ minimization system in embodiments of the present disclosure addresses this issue by adjusting the location of the IoT edge gateway device(s) with respect to the plurality of AP IoT servers to minimize power consumed and $CO_2$ emitted during transceiving of IoT data between the plurality of AP IoT servers and the IoT edge gateway device(s). The IoT edge gateway device location optimization and $CO_2$ minimization system in embodiments may operably connect the IoT edge gateway device at an initial geographic location to each of a plurality of AP IoT servers via wired or wireless connections.

Over a monitoring period, the IoT edge gateway device location optimization and $CO_2$ minimization system may gather power consumption metrics (e.g., in kWh), IoT data transfer volumes (e.g., in Gb), and geographic locations of each of the operably connected AP IoT servers. Based on these gathered metrics, the IoT edge gateway device location optimization and $CO_2$ minimization system in embodiments may determine, for each of the operably connected AP IoT servers, an amount of $CO_2$ emitted per unit of distance (e.g., km) over which the IoT data is being transceived between each of the AP IoT servers and the IoT edge gateway device via an enterprise WAN. Because IT data transfer between some AP IoT servers and the IoT edge gateway device may result in higher $CO_2$ emissions per unit of distance (e.g., tons $CO_2$ per km) than IoT data transfer between the IoT edge gateway device and other AP IoT servers, moving the IoT edge gateway device closer to the AP IoT servers associated with higher $CO_2$ emissions per unit of distance may decrease overall $CO_2$ emissions during IoT data transfer from all of the AP IoT servers to the IoT edge gateway device in an enterprise WAN. In embodiments herein, a hardware processor executing code instructions of the IoT edge gateway device location optimization and $CO_2$ minimization system may determine an optimal geographic location for the IoT edge gateway device based on these determined $CO_2$ emissions per unit of distance measurements for each of the AP IoT servers that transmit IoT data to the cloud via the IoT edge gateway device and on the fixed geographic locations of each of these AP IoT servers. The hardware processor of the IoT edge gateway device in embodiments may then transmit an instruction to a user of the IoT edge gateway device to place the IoT edge gateway device at the optimal geographic location.

In other aspects of embodiments herein, a hardware processor executing code instructions of the IoT edge gateway device location optimization and $CO_2$ minimization system may continue to monitor IoT data transfer volumes and power consumption metrics from the plurality of AP IoT servers transmitting IoT data on the enterprise WAN to identify whether repositioning of the IoT edge gateway device may be appropriate, as IoT data transfer volumes for one or more of the AP IoT servers varies over time. In other cases, it may be more appropriate to add another IoT edge gateway device to the network of AP IoT servers in order to minimize total $CO_2$ emissions across the network of AP IoT servers. For example, following placement of the IoT edge gateway device at the determined optimal geographic location as described directly above, the IoT edge gateway device location optimization and $CO_2$ minimization system in embodiments may monitor the total $CO_2$ emissions resulting from power consumed during transfer of IoT data between or among each of the plurality of AP IoT servers and currently existing location optimized IoT edge gateway devices in the enterprise WAN. These $CO_2$ emissions values may increase or decrease over time as the amount of IoT data transferred changes or if transmission or network changes are made, and thus power consumed during such transfer from any of the plurality of AP IoT servers either increases or decreases. When the total $CO_2$ emissions increases by a preset threshold value (e.g., 5%) since last placement of the IoT edge gateway device at the optimal geographic location, the IoT edge gateway device location optimization and $CO_2$ minimization system may identify one or more AP IoT servers whose IoT data transfer volumes have increased on the enterprise WAN as potential causes for the increase in total $CO_2$ emissions.

The IoT edge gateway device hardware processor executing code instructions of the IoT edge gateway device location optimization and $CO_2$ minimization system in embodiments herein may determine whether adjusting the location of the currently existing IoT edge gateway device or adding another IoT edge gateway device at a second optimized geographic location is more likely to minimize total $CO_2$ emissions during IoT data transfer among the plurality of AP IoT servers to the one or more IoT edge gateway devices on the enterprise WAN. This determination may be made based on updated determinations of CO2 emissions per unit of distance for each of the plurality of AP IoT servers from the number of transmission hops, transmission types of each hop and the like indicating power consumed or lost, geographic locations of those AP IoT servers, and the optimal geographic location for the IoT edge gateway device at which an existing IoT edge gateway device is currently operating. If the IoT edge gateway device location optimization and CO2 minimization system determines that moving the existing IoT edge gateway device to an updated optimized geographic location is most likely to minimize CO2 emissions, the hardware processor of the IoT edge gateway device may then transmit an instruction to the user of the IoT edge gateway device to place the IoT edge gateway device at the updated optimal geographic location. If the IoT edge gateway device location optimization and CO2 minimization system determines that adding a second IoT edge gateway device to a second optimized geographic location is most likely to minimize CO2 emissions, the hardware processor of the IoT edge gateway device may then transmit an instruction to the user of the IoT edge gateway device to place the second IoT edge gateway device at the second optimal geographic location and to reroute IoT data transfer from one or more AP IoT servers away from the existing IoT edge gateway device to the second IoT edge gateway device. In such a way, the IoT edge gateway device location optimization and CO2 minimization system may adjust the location(s) of IoT edge gateway device(s) with respect to a plurality of operably connected AP IoT servers in an enterprise WAN to minimize power consumed and CO2 emitted during transceiving of IoT data between the plurality of AP IoT servers and the IoT edge gateway device(s).

FIG. 1 illustrates an information handling system 100 according to several aspects of the present disclosure. As described herein, an information handling system 100 of an Internet of Things (IoT) edge gateway device may execute code instructions of an IoT edge gateway device location optimization and carbon dioxide (CO2) minimization system 180 to adjust the location(s) of IoT edge gateway information handling system(s) (e.g., 100) with respect to a plurality of operably connected Access Point (AP) IoT servers (e.g., 130 or 140) to minimize power consumed and CO2 emitted during transceiving of IoT data between the plurality of AP IoT servers (e.g., 130 or 140) and the IoT edge gateway information handling systems (e.g., 100).

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102. (with computer readable medium 186 that is volatile (e.g. random-access memory (RAM), dynamic RAM (DRAM), etc.), nonvolatile memory (read-only memory, flash memory, non-volatile RAM (NVRAM), etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices, a wireless network interface device 160, one or more communications ports for communicating with external devices, as well as various input and output (I/O) devices 110, such as a keyboard, a mouse, touchpad or any combination thereof. A power management unit (PMU) 104 supplying power to the information handling system 100, via a battery 105 or an alternating current (A/C) power adapter 106 may supply power to one or more components of the information handling system 100, including the hardware processor 101, or other hardware processing resources executing code instructions of the IoT edge gateway device location optimization and CO2 minimization system 180, the wireless network interface device 160, one or more storage devices such as a static memory 103 or drive unit 107, a, a video display 109, or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, such as for the IoT edge gateway device location optimization and CO2 minimization system 180, that may operate on servers or systems, remote data centers, or on-box according to various embodiments herein. In some embodiments, it is understood any or all portions of code instructions 187 may operate on a plurality of information handling systems 100. The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system with processing resources executing code instructions of an IoT edge gateway device location optimization and CO2 minimization system 180, operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network access point (AP) or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHZ, 5 GHZ, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHZ, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

The network interface device 160 in an embodiment may operably connect the information handling system 100 to one or more AP IoT servers (e.g., 130 or 140) via wired or wireless links. For example, in a first embodiment, the network interface device 160 may be operably connected so as to allow for the transfer of IoT data between the AP IoT server 130 and the information handling system 100 via a wireless link, including over a WLAN, WWAN, or WPAN connection. As another example, in a second embodiment, the network interface device 160 may be operably connected so as to allow for the transfer of IoT data between the AP IoT server 140 and the information handling system 100 via a wired link, including over a LAN, WAN, or PAN connection, and particularly over a fiber-optic cable or fabric connection. In another aspect of an embodiment, the network interface device 160 may be capable of transmitting instructions to a user interface 150 via the network 170. Such a user interface 150 may be a graphical user interface (GUI) of a user-controlled information handling system (e.g., computing device), a GUI of the IoT edge gateway device information handling system 100, or any other type of user interface located either within the IoT edge gateway device information handling system 100 or remotely therefrom, including an e-mail or instant messaging user interface assigned to a managing user of the IoT edge gateway device information handling system 100. Optimal geographic locations for the IoT edge gateway device information handling system 100, as determined by the hardware processor 101 executing code instructions of the IoT edge gateway device location optimization and CO2 minimization system 180 in an embodiment may be transmitted to the user interface 150. These instructions may instruct the user to place the IoT edge gateway information handling system 100 at that optimal geographic location so as to minimize CO2 emitted during transfer of IoT data between the IoT edge gateway information handling system 100 and the various AP IoT servers (e.g., 130 and 140).

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing code instructions for systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, at a device connected to a network 170. Further, the instructions 187 may be transmitted or received over the network 170 via the network interface device 160. The information handling system 100 may include a set of instructions 187 that may be executed to adjust the location(s) of IoT edge gateway information handling system(s) (e.g., 100) with respect to a plurality of operably connected AP IoT servers (e.g., 130, 140, or 150) to minimize power consumed and CO2 emitted during transceiving of IoT data between the plurality of AP IoT servers (e.g., 130, 140) and the IoT edge gateway information handling systems (e.g., 100), such as on an enterprise WAN, or a network operated by a mobile network operator (MNO), mobile virtual network operator (MVNO), MVNO-enhanced (MVNO-E), full MVNO, or the like. For example, instructions 187 may include a particular example of an IoT edge gateway device location optimization and CO2 minimization system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The IoT edge gateway device location optimization and CO2 minimization system 180 may utilize a computer-readable medium 186 in which one or more sets of instructions 187 may operate in part as software or firmware instructions executed via hardware processing resources on the information handling system 100. The instructions 187 may embody one or more of the methods as described herein. For example, code instructions relating to the IoT edge gateway device location optimization and CO2 minimization system 180, firmware or software algorithms, processes, and/or methods may be stored here. The IoT edge gateway device location optimization and CO2 minimization system 180 may operate on hardware processing resources within an IoT edge gateway information handling system 100 that gathers telemetries from a plurality of operably connected AP IoT servers (e.g., 130, 140) via those network connections such as an enterprise WAN that describe operating environments for those AP IoT servers (e.g., 130, 140).

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the IoT edge gateway device location optimization and CO2 minimization system 180 may be stored in static memory 103, or the drive unit 107 on a computer-readable medium 186 such as a flash memory or magnetic disk in an example embodiment. More specifically, network and AP IoT server telemetries describing power consumption, geographic locations, and IoT data transfer volumes for a plurality of operably connected AP IoT servers (e.g., 130 and 140) and enterprise WAN connectivity may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express (PCIe) card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, ARM® brand hardware processors, Qualcomm® brand hardware processors, or other hardware processors and chipsets, or other such device, or software capable of operating a relevant environment of the information handling system. The hardware system, hardware device, hardware controller, or hardware module may also comprise a combination of the foregoing examples of hardware, hardware processors, or controllers executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2A:
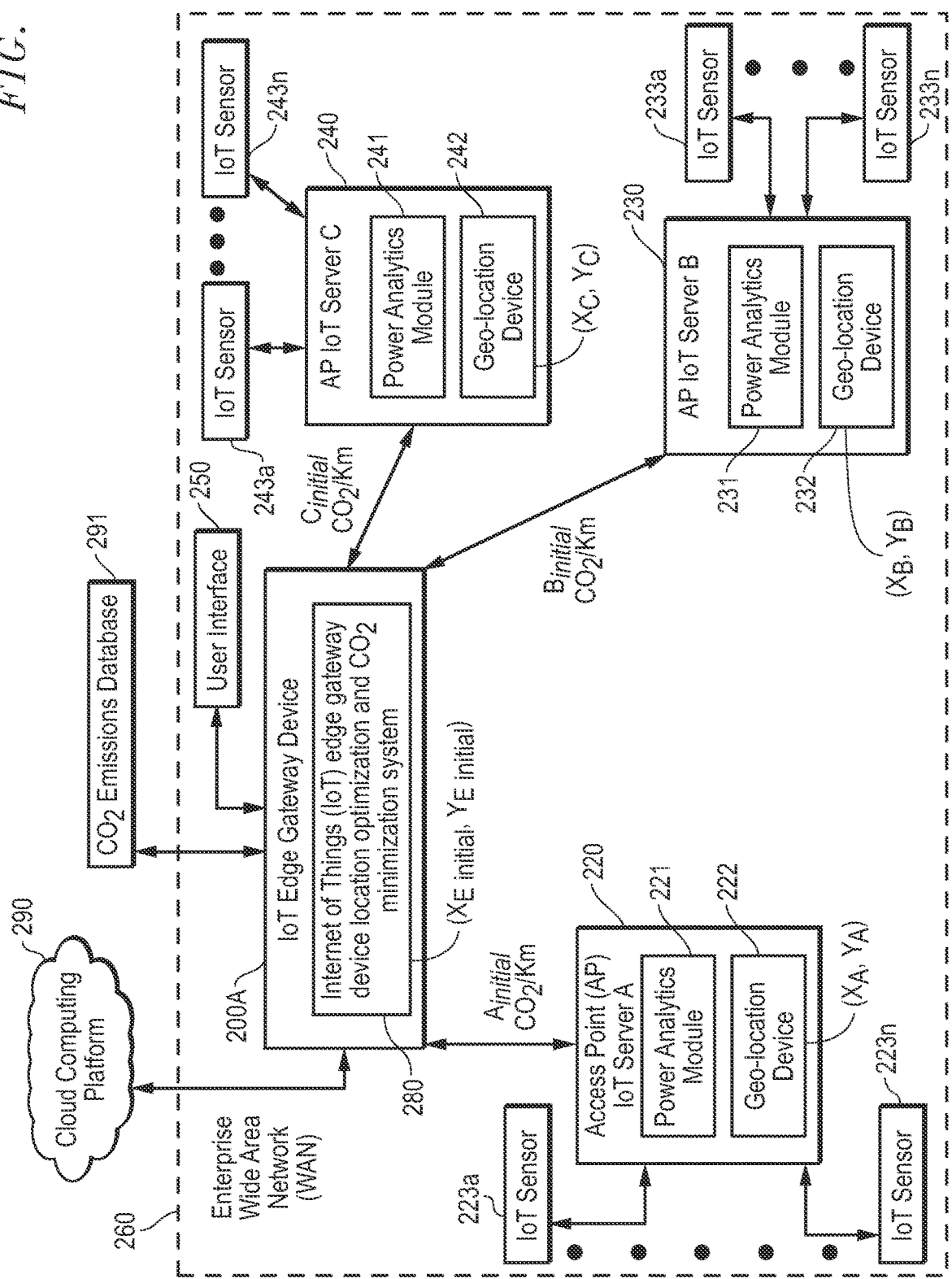
FIG. 2A is a block diagram illustrating an IoT edge gateway device located at an initial location gathering operational Access Point (AP) IoT server telemetries from a plurality of operably connected AP IoT servers according to an embodiment of the present disclosure.

FIG. 2A is a block diagram illustrating an Internet of Things (IoT) edge gateway device information handling system located at an initial non-optimized geographic location gathering operational telemetries from a plurality of operably connected Access Point (AP) IoT servers in a network such as an enterprise wide area network (WAN) operated by a mobile network operator (MNO) or the like for collection of IoT data according to an embodiment of the present disclosure. As described herein, each AP IoT server (e.g., 220, 230, 240) may communicate with a plurality of IoT sensors (e.g., 223a to 223n, 233a to 233n, 234a to 234n, respectively) within a low-power wide area network (LPWAN) in accordance with the 3GPP narrow band (NB) IoT data transmission standard (NB-IoT). Each AP IoT server (e.g., 220, 230, 240) may also communicate upstream with an IoT edge gateway device 200A within an enterprise WAN 260, which may be a network operated by an MNO, an MVNO, an MVNO-E, a full MVNO. The enterprise that operates the WAN 260, MNO, MVNO, MVNO-E or full MVNO may own or rent specific frequency ranges within existing cellular network frequency bands at which only the MNO, MVNO, or operator of the WAN 260 may transmit IoT sensor data or any other signals.

This linked network infrastructure may enable IoT sensor devices (e.g., 223a to 223n, 233a to 233n. 234a to 234n) to transmit IoT sensor data to the cloud platform 290 via existing enterprise WAN (e.g., 260) operated by MNOs as well as over mobile carrier networks or public networks (e.g., internet connections) over potentially large distance ranges (e.g., akin to the wide area network (WAN) design of cellular technologies such as Global System for Mobile Communications (GSM) and Long Term Evolution (LTE)). In order to cover potentially large areas while ensuring low power consumption of IoT sensors (e.g., 223a to 223n, 233a to 233n, 234a to 234n), this linked network infrastructure and the NB-IoT standard employ a new physical layer with signals and channels to meet the requirements of extended coverage in rural areas and deep indoors, while enabling very low IoT sensor device complexity. For example, in order to cover a potentially large area, or long distance between any given IoT sensor (e.g., 223a to 223n. 233a to 233n, 234a to 234n) and an IoT edge gateway device information handling system (e.g., 200A), one AP IoT server (e.g., 220, 230, or 240, respectively) may be placed nearby a plurality of IoT sensors (e.g., 223a to 223n, 233a to 233n, 234a to 234n, respectively) to act as an intermediate gateway between the IoT sensors (e.g., 223a to 223n, 233a to 233n, 234a to 234n) and the IoT edge gateway device 200A. The IoT edge gateway device 200A may then have access to the public internet for transmission of IoT sensor data to a cloud application or platform 290. Each of the AP IoT servers (e.g., 220, 230, of 240) in an embodiment may gather IoT sensor data from their respective groups of IoT sensors (e.g., 223a to 223n, 233a to 233n, 234a to 234n, respectively) using short range, high-bandwidth communications in an LPWAN. This IoT data may be gathered from a plurality of enterprise facilities and is to be transferred to backend software applications, such as enterprise facility monitoring software systems, at the cloud platform 290.

As more AP IoT servers come online to communicate with IoT sensors (e.g., 223a to 223n. 233a to 233n. 234a to 234n) via individual LPWANs, and more IoT sensors (e.g., 223a to 223n. 233a to 233n, 234a to 234n) are added to existing LPWANS, amounts of IoT data transmitted from each AP IoT server (e.g., 220, 230, or 240) to the IoT edge gateway device 200A may change over time. Thus, as AP IoT servers (e.g., 220, 230, 240) come online at further and further distances or more IoT data is being transmitted by these AP IoT servers (e.g., 220, 230, 240) to the IoT edge gateway device 200A, the location of existing intermediate IoT edge gateway device (e.g., 200A) or even the number deployed in an enterprise WAN 260 may become less energy efficient.

As described herein, a single IoT edge gateway device (e.g., 200A) may operate to connect a plurality of AP IoT servers (e.g., 220, 230, 240) to an external network 290 such as a cloud computing application or platform. Carbon dioxide ($CO_2$) emitted during IoT data transmission via connections between those AP IoT servers (e.g., 220, 230, or 240) and an IoT edge gateway information handling system 200A may be dependent upon power consumed by those AP IoT servers (e.g., 220, 230, or 240) and any transmission hops during such IoT data transmission in the enterprise WAN 260. The amount of power consumed during such transmission by any one of the AP IoT servers (e.g., 220, 230, or 240) may be dependent on the IoT data transfer rates (Gb/s) within Quality of Service (QOS) requirements for each of the AP IoT servers (e.g., 220, 230, or 240), the geographic locations of the AP IoT servers (e.g., 220, 230, or 240) and the IoT edge gateway device 200A (e.g., distances between them in the enterprise WAN 260), and the volume of IoT data transceived. A hardware processor of the IoT edge gateway device 200A executing code instructions of the IoT edge gateway device location optimization and $CO_2$ minimization system 280 in an embodiment may determine an optimal geographic location for the IoT edge gateway device 200A with respect to the plurality of AP IoT servers (e.g., 220, 230, and 240) in the enterprise WAN 260 so as to minimize power consumed and $CO_2$ emitted during transceiving of IoT data between the plurality of AP IoT servers (e.g., 220, 230, and 240) and the IoT edge gateway device 200A.

To begin this process, a user of the IoT edge gateway device 200A in an embodiment may place the IoT edge gateway device 200A at an initial geographic location having coordinates ($X_{Einitial}$, and $Y_{Einitial}$). These coordinates may be GPS coordinates or latitude and longitude in various embodiments. The user of the IoT edge gateway device 200A in such an embodiment may then operably connect the IoT edge gateway device 200A at the initial geographic location ($X_{Einitial}$, $Y_{Einitial}$) to each of the plurality of AP IoT servers 220, 230, and 240 via wired or wireless connections in the enterprise WAN 260. Over a monitoring period, a hardware processor of the IoT edge gateway device 200A may execute code instructions of the IoT edge gateway device location optimization and $CO_2$ minimization system 280 to gather power consumption metrics (e.g., in kWh), and IoT data transfer volumes (e.g., in Gb) for each of the AP IoT servers 220, 230, and 240. Each of the AP IoT servers 220, 230, and 240 may comprise a power analytics module (e.g., 221, 231, and 241, respectively) that monitors power consumed by the AP IoT servers 220, 230, and 240 during transmission of IoT data to the IoT edge gateway device 200A. The IoT edge gateway device location optimization and $CO_2$ minimization system 280 may further determine a geographic location ($X_A$, $Y_A$) for AP IoT server A 220, a geographic location ($X_B$, $Y_B$) for AP IoT server B 230, and a geographic location ($X_C$, $Y_C$) for AP IoT server C 240. Each of AP IoT servers 220, 230, and 240 may comprise a geo-location device (e.g., 222, 232, or 242, respectively) that is capable of identifying a geographic location for each of the AP IoT servers 220, 230, and 240. For example, such a geo-location device (e.g., 222, 232, 242) may comprise a GPS unit, or a network interface device capable of providing an IP address that may be used to provide a geographic location for each of the AP IoT servers 220, 230, or 240 relative to transmitters, switches, or the like within the enterprise WAN.

Based on these gathered power and location metrics, a hardware processor of the IoT edge gateway device 200A may execute code instructions of the IoT edge gateway device location optimization and CO2 minimization system 280 in an embodiment to determine, for each of the operably connected AP IoT servers 220, 230, 240, an amount of CO2 emitted per unit of distance (e.g., km) over which the IoT data is being transmitted to the IoT edge gateway device 200A in an enterprise WAN 260. Such a determination may be made, in an embodiment, based on gathered power consumption analytics, distance or number of transmission hops between the AP IoT servers 220, 230, and 240, respectively and the IoT edge gateway device 200A, and a measured amount of CO2 emitted per kWh of power consumed at each of the specific geographic locations of the AP IoT servers 220, 230, and 240, or portions of the enterprise WAN 260 used.

The amount of CO2 emitted per kWh of power consumed at a given geographic location may vary based on the type of energy used at the power facility supplying power to the geographic area in which a given AP IoT server 220, 230, or 240 or portions of the enterprise WAN 260 may be located. As described herein, one or more of the AP IoT servers 220, 230, or 240 in an embodiment may be located within the same enterprise facility, which may draw power from a single power facility. In other embodiments, one or more of the AP IoT servers 220, 230, or 240 may be located at separate enterprise facilities spaced many kilometers from one another, such that one or more of the AP IoT servers 220, 230, or 240 draw power from a different power facility than the others. Each of the power facilities from which AP IoT servers 220, 230, and 240 draw power may generate electricity using various methods, such as burning of fossil fuels, hydroelectric power, or solar power. As such, the carbon footprint or amount of CO2 emitted per kWh of power generated at each of these power facilities may also vary. A hardware processor of the IoT edge gateway device 200A may execute code instructions of the IoT edge gateway device location optimization and CO2 minimization system 280 in an embodiment to determine an amount of CO2 emitted (e.g., in kg or tons) per kWh of power consumed at the specific geographic locations for each of the AP IoT servers 220, 230, and 240 as well as any locations for intermediate enterprise WAN 260 components by communicating with a publicly available CO2 emissions database 291 that stores such information for geographic regions across the globe.

In one example embodiment, the processor executing code instructions of the IoT edge gateway device location optimization and CO2 minimization system 280 in an embodiment may then determine the CO2 emitted per unit of distance over which IoT data is transferred from a given AP IoT server (e.g., 220, 230, or 240) to the IoT edge gateway device 200A by dividing the CO2 emitted per kWh of power by the distance between a location $(X_A, Y_A)$ for a given AP IoT server (e.g., 220, 230, or 240) and the location $(X_{EInitial}, Y_{EInitial})$ for the IoT gateway device 200A and multiplying that value by the power consumed (in kWh) by each of the AP IoT servers (e.g., 220, 230, and 240, respectively) and any intermediate enterprise WAN 260 components during transmission of IoT data to the IoT edge gateway device 200A. For example, the value A of CO2 emitted per unit of distance for AP IoT server A 220 may be determined using the following example equation (1), where the CO2 per kWh value is drawn from the CO2 emissions database 291 for the geographic location $(X_A, Y_A)$ of the AP IoT server A 220:

$$\frac{CO_2}{km} \text{ for } IoT \text{ server } A = \frac{CO_2}{kWh} * \frac{\text{kWh consumed by } IoT \text{ server } A}{\sqrt{(X_{Einitial} - X_A)^2 + (Y_{Einitial} - Y_A)^2}} \quad (1)$$

Execution of code instructions of the IoT edge gateway device location optimization and CO2 minimization system 280 in an embodiment may use an algorithmic execution of code instructions involving the above relationships shown in equation (1) to determine a value $A_{initial}$ of CO2 emitted per unit of distance for the transfer of IoT data between the AP IoT server A 220 and the IoT edge gateway device 200A. Execution of code instructions of the IoT edge gateway device location optimization and CO2 minimization system 280 in an embodiment may also use the above relationships as shown in the example of equation (1), to determine value $B_{initial}$ of CO2 emitted per unit of distance for the transfer of IoT data between the AP IoT server B 230 and the IoT edge gateway device 200A. The above relationships such as equation (1) in an embodiment may also be used by the IoT edge gateway device location optimization and CO2 minimization system 280 executing code instructions to determine a value $C_{initial}$ of CO2 emitted per unit of distance for the transfer of IoT data between the AP IoT server C 240 and the IoT edge gateway device 200A.

For example, in an embodiment, the AP IoT server A 220 may consume an average over a preset time period (e.g., one week) of 100 kWh of power during the transfer of a first amount of IoT data over 200 km between the AP IoT server A 220 and the IoT edge gateway device 200A in the enterprise WAN 260, where the power facility supplying power to AP IoT server A 220 emits 0.3 kg of CO2 per kWh supplied. In such an embodiment, the hardware processor of the IoT edge gateway device 200A executing code instructions of the IoT edge gateway device location optimization and CO2 minimization system 280 may determine the AP IoT server A 220 emits an $A_{initial}$ value of 0.15 kg CO2 per km during the transfer of IoT data between the AP IoT server A 220 and the IoT edge gateway device 200A. As another example, in another aspect of that embodiment, the AP IoT server B 230 (e.g., located within the same enterprise facility as AP IoT server A 220) may consume an average of 500 kWh of power during the transfer of a second, larger amount of IoT data over 200 km between the AP IoT server B 220 and the IoT edge gateway device 200A, where the power facility supplying power to AP IoT server B 220 also emits 0.3 kg of CO2 per kWh supplied. In such an embodiment, the hardware processor of the IoT edge gateway device 200A executing code instructions of the IoT edge gateway device location optimization and CO2 minimization system 280 may determine the AP IoT server B 230 emits a $B_{initial}$ value of 0.75 kg CO2 per km during the transfer of IoT data between the AP IoT server B 230 and the IoT edge gateway device 200A in the enterprise WAN 260 due to larger IoT data transfer. In still another example, in yet another aspect of that embodiment, the AP IoT server C 240 (e.g., located in a separate enterprise facility than IoT A 220 or IoT B 230) may consume an average of 100 kWh of power during the transfer of a third level of IoT data over 50 km between the AP IoT server C 240 and the IoT edge gateway device 200A, where the power facility supplying power to AP IoT server C 240 and the enterprise WAN 260 emits 0.85 kg of CO2 per kWh supplied. In such an embodiment, the hardware processor of the IoT edge gateway device 200A executing code instructions of the IoT edge gateway device location optimization and CO2 minimization system 280 may determine the AP IoT server C 240 emits a $C_{initial}$ value of 1.7 kg CO2 per km during the transfer of IoT data between the AP IoT server C 240 and the IoT edge gateway device 200A across the enterprise WAN 260.

Because IoT data transfer between some AP IoT servers (e.g., AP IoT server C 240) and the IoT edge gateway device 200A may result in higher CO2 emissions per unit of distance (e.g., 1.7 kg CO2 per km) than IoT data transfer between the IoT edge gateway device 200A and other AP IoT servers (e.g., AP IoT server A 220 associated with 0.15 kg CO2 per km), moving the IoT edge gateway device 200A closer to the AP IoT servers (e.g., AP IoT server C 240) associated with higher CO2 emissions per unit of distance may decrease overall CO2 emissions during IoT data transfer from all of the AP IoT servers to the IoT edge gateway device. In an embodiment, a hardware processor of the IoT edge gateway device 200A executing code instructions of the IoT edge gateway device location optimization and CO2 minimization system 280 may determine an optimal geographic location for the IoT edge gateway device 200A based on these determined CO2 emissions per unit of distance measurements (e.g., $A_{initial}$, $B_{initial}$, and $C_{initial}$) for each of the AP IoT servers (e.g., 220, 230, and 240) and on the fixed geographic locations of each of these AP IoT servers (e.g., 220, 230, and 240) at the enterprise facilities. For example, the hardware processor of the IoT edge gateway device 200A may execute code instructions of the IoT edge gateway device location optimization and CO2 minimization system 280 to use the above determination of data for CO2 levels and factors, such as with an algorithmic set of code instructions that may implement a determination, such as with algorithmic execution of following example equation (2), to determine the total CO2 emitted as a function of the determined CO2 emissions per unit of distance measurements (e.g., A or $A_{initial}$, B or $B_{initial}$, and C or $C_{initial}$, respectively) and geographic locations (e.g., $(X_A, Y_A)$, $(X_B, Y_B)$, and $(X_C, Y_C)$, respectively) for each of the AP IoT servers 220, 230, and 240.

$$\text{Total CO}_2 = \sqrt{\left[\left(X_E - \left(\frac{A^2 X_A + B^2 X_B + C^2 X_C}{A^2 + B^2 + C^2}\right)\right)\right]^2 + \left[Y_E - \left(\frac{A^2 Y_A + B^2 Y_B + C^2 Y_C}{A^2 + B^2 + C^2}\right)\right]^2} \quad (2)$$

Figure 3:
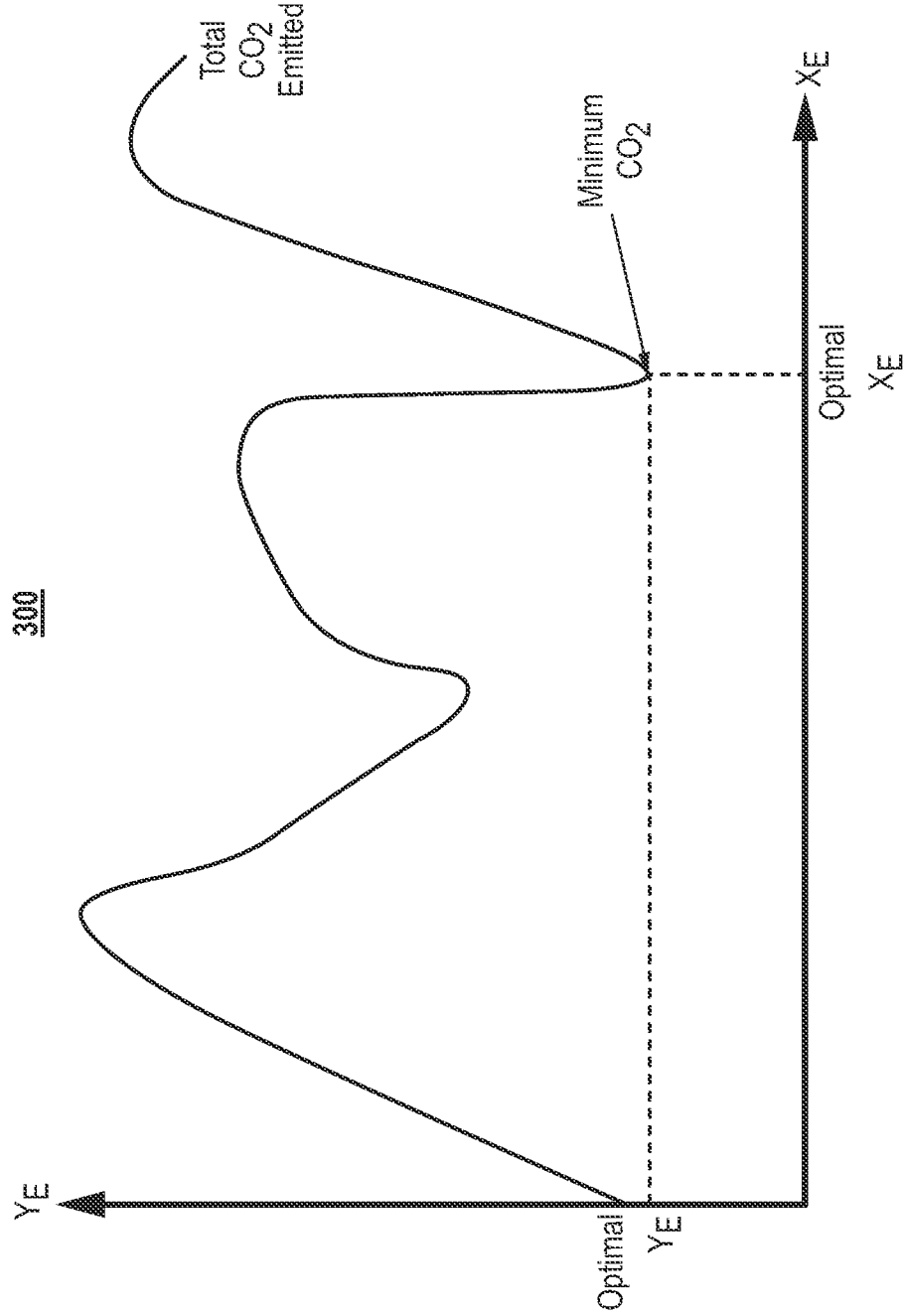
FIG. 3 is a graphical illustration of a plot of CO2 emissions as a function of the geographic location of an IoT edge gateway device relative to locations of a plurality of AP IoT servers to identify an optimal geographic location according to an embodiment of the present disclosure.

In an example embodiment, the hardware processor of the IoT edge gateway device 200A executing code instructions of the IoT edge gateway device location optimization and CO2 minimization system to then plot the total CO2 determined as a function of the geographic location $(X_E, Y_E)$ of the IoT edge gateway device 200A to identify an optimal geographic location for the IoT edge gateway device 200A $(X_{EOPT}, Y_{EOPT})$ at which the total CO2 is minimized, as described in greater detail below with respect to FIG. 3. The hardware processor of the IoT edge gateway device 200A executing code instructions of the IoT edge gateway device location optimization and CO2 minimization system in an embodiment may then transmit an instruction to a user interface 250 for display to a user of the IoT edge gateway device 200A to place the IoT edge gateway device 200A at the optimal geographic location $(X_{EOPT}, Y_{EOPT})$ in the enterprise WAN 260 at which the total CO2 is minimized.

Figure 2B:
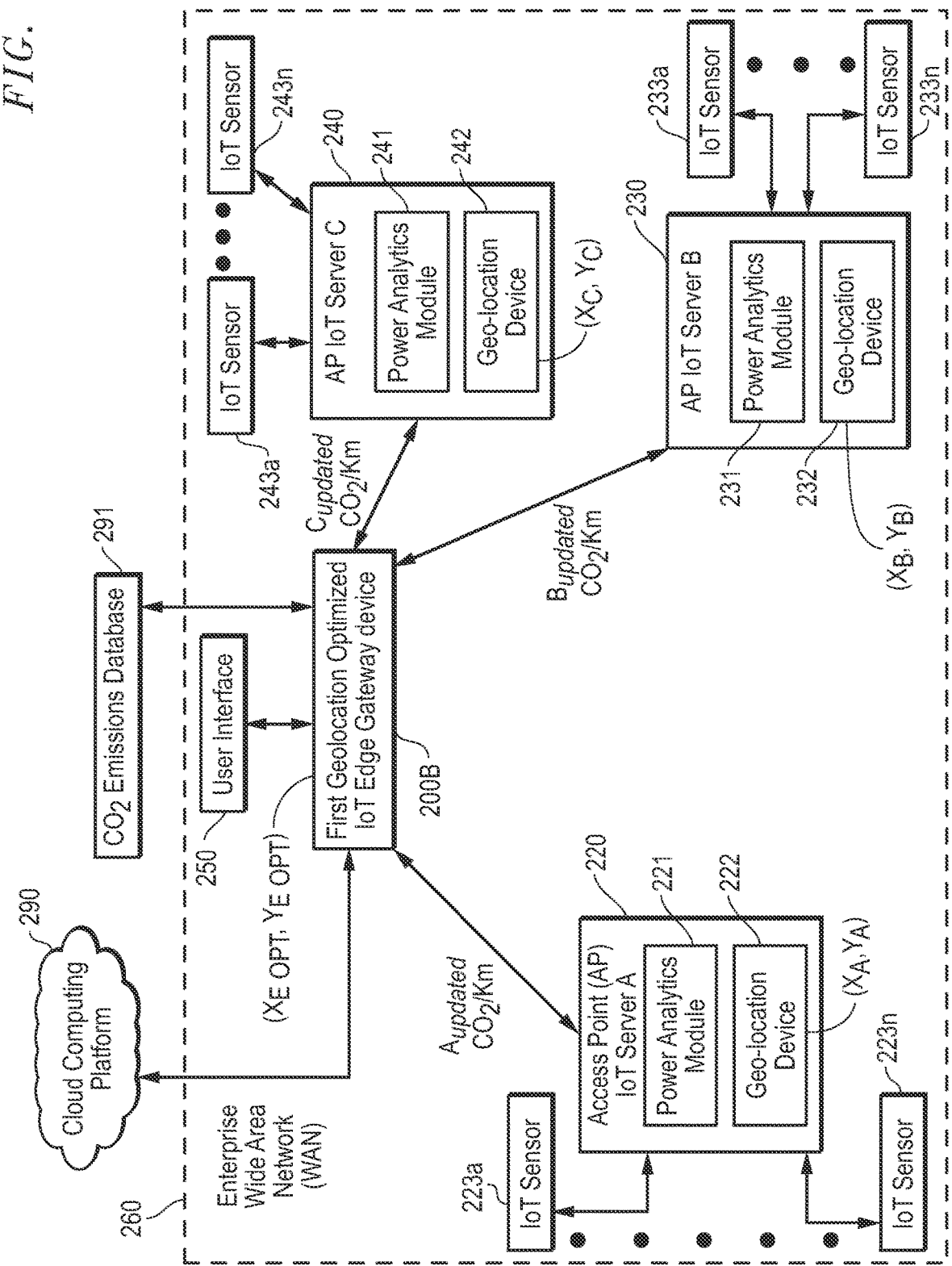
FIG. 2B is a block diagram illustrating an IoT edge gateway device located at an optimized geographic location to minimize carbon dioxide (CO2) emissions due to IoT data transmission with AP IoT servers for sets of IoT sensors according to an embodiment of the present disclosure.

FIG. 2B is a block diagram illustrating an Internet of Things (IoT) edge gateway device information handling system 200B located at an optimized geographic location for transceiving IoT data with a plurality of operably connected Access Point (AP) IoT servers in order to minimize CO2 emissions due to such IoT data transmission according to an embodiment of the present disclosure. Upon receipt of the optimal geographic location $(X_{EOPT}, Y_{EOPT})$ at which the total CO2 determined by execution of the code instructions of the IoT edge gateway device location optimization and CO2 minimization system is minimized and presented at the user interface 250, the user may physically move the IoT edge gateway device 200B to the optimal geographic location $(X_{EOPT}, Y_{EOPT})$. The AP IoT servers 220, 230, and 240 may then be operably connected to the IoT edge gateway device 200B, which may now be operating as a geolocation optimized IoT edge gateway device 200B.

A hardware processor executing code instructions of the IoT edge gateway device location optimization and CO2 minimization system 280 may continue to monitor IoT data transfer volumes and power consumption metrics from the plurality of AP IoT servers 220, 230, and 240 to identify whether repositioning of the IoT edge gateway device 200B in an enterprise wide area network (WAN) 260 may be appropriate, as IoT data transfer volumes for one or more of the AP IoT servers (e.g., 220, 230, or 240) varies over time. In other cases, it may be more appropriate to add another IoT edge gateway device (e.g., 205 in FIG. 2C) to the enterprise WAN 260 of AP IoT servers (e.g., including 220, 230, and 240) among one or more enterprise facility locations in order to minimize total CO2 emissions across the network of AP IoT servers (e.g., including 220, 230, and 240). For example, following placement of the IoT edge gateway device 200B at the determined optimal geographic location $(X_{EOPT}, Y_{EOPT})$ in the enterprise WAN 260 as described directly above, the hardware processor of the geolocation optimized IoT edge gateway device 200B may execute code instructions of the IoT edge gateway device location optimization and CO2 minimization system 280 in an embodiment to monitor the total CO2 emissions resulting from power consumed during transfer of IoT data between or among each of the plurality of AP IoT servers 220, 230, and 240 and the geolocation optimized IoT edge gateway device 200B in the enterprise WAN 260.

These CO2 emissions values may increase or decrease over time as the amount of IoT data transferred, and thus power consumed during such transfer from any of the plurality of AP IoT servers either increases or decreases. For example, a period of time (e.g., one year, one month, six months) after the geolocation optimized IoT edge gateway device 200B has been placed at the determined optimal geographic location $(X_{EOPT}, Y_{EOPT})$, the hardware processor of the geolocation optimized IoT edge gateway device 200B may execute code instructions of the IoT edge gateway device location optimization and CO2 minimization system 280 to determine an updated amount $A_{updated}$ of CO2 emitted per unit of distance during transmission of IoT data from the AP IoT server A 220 to the geolocation optimized IoT edge gateway device 200B in the enterprise WAN 260. More specifically, the volume of IoT data transmitted between AP IoT server A 220 and the geolocation optimized IoT edge gateway device 200B may have increased substantially due to added NB-IoT sensors 223a to 223n at AP IoT server A 220, causing an increase in the power consumed during the transfer of such IoT data from the initial measured value of 100 kWh to 800 kWh. In such an example embodiment, the hardware processor of the geolocation optimized IoT edge gateway device 200B may execute code instructions of the IoT edge gateway device location optimization and CO2 minimization system 280 to determine an updated amount $A_{updated}$ of 1.2 kg CO2 per km for IoT data transfer between AP IoT server A 220 and optimized IoT edge gateway device 200B. The hardware processor of the geolocation optimized IoT edge gateway device 200B may execute code instructions of the IoT edge gateway device location optimization and CO2 minimization system 280 may perform a similar analysis to determine a value of $B_{updated}$ for the transfer of current IoT data levels between the AP IoT server 230 and the geolocation optimized IoT edge gateway device 200B, and to determine a value of $C_{updated}$ for the transfer of that IoT data between the AP IoT server 240 and the geolocation optimized IoT edge gateway device 200B. The hardware processor of the geolocation optimized IoT edge gateway device 200B may execute code instructions of the IoT edge gateway device location optimization and CO2 minimization system 280 in an embodiment to then determine a current or updated total CO2 emissions value for IoT data transfer between AP IoT server B 230, or AP IoT server C 240, and the optimized IoT edge gateway device 200B, based on these updated values (e.g., $A_{updated}$, $B_{updated}$, and $C_{updated}$). This updated total CO2 emissions value may be compared to the total CO2 emissions value calculated previously for AP IoT server A 220, AP IoT server B 230, and AP IoT server C 240 above for the initial values (e.g., $A_{initial}$, $B_{initial}$, and $C_{initial}$) to determine an increase (or decrease in some embodiments) in the total CO2 emissions since placement of the geolocation optimized IoT edge gateway device 200B at the optimal geographic location ($X_{EOPT}$, $Y_{EOPT}$) in the enterprise WAN 260.

When the total CO2 emissions increases by a preset threshold value (e.g., 5%) since placement of the geolocation optimized IoT edge gateway device 200B at the optimal geographic location ($X_{EOPT}$, $Y_{EOPT}$) in the enterprise WAN 260, a hardware processor of the geolocation optimized IoT edge gateway device 200B executing code instructions of the IoT edge gateway device location optimization and CO2 minimization system may identify one or more AP IoT servers (e.g., AP IoT server A 220) whose IoT data transfer volumes have increased (e.g., from a volume resulting in 100 kWh of power consumption to a volume resulting in 800 kWh of power consumption) as a potential cause for the increase in total CO2 emissions.

This may be determined by analysis of the volume of IoT data transferred or the IoT data transfer rate required by QoS terms for each of the AP IoT servers 220, 230, and 240 across the enterprise WAN 260, as routinely gathered at the geolocation optimized IoT edge gateway device 200B in an embodiment. More specifically, the hardware processor of the geolocation optimized IoT edge gateway device 200B in an embodiment may execute code instructions of the IoT edge gateway device location optimization and Co2 minimization system to determine the IoT data volumes or IoT data rates for AP IoT servers 230 and 240 have remained relatively stable, but that the IoT data volume or IoT data rate for the AP IoT server 220 has increased by a factor of eight since the geolocation optimized IoT edge gateway device 200B has been placed at the optimal geographic location ($X_{EOPT}$, $Y_{EOPT}$).

Figure 2C:
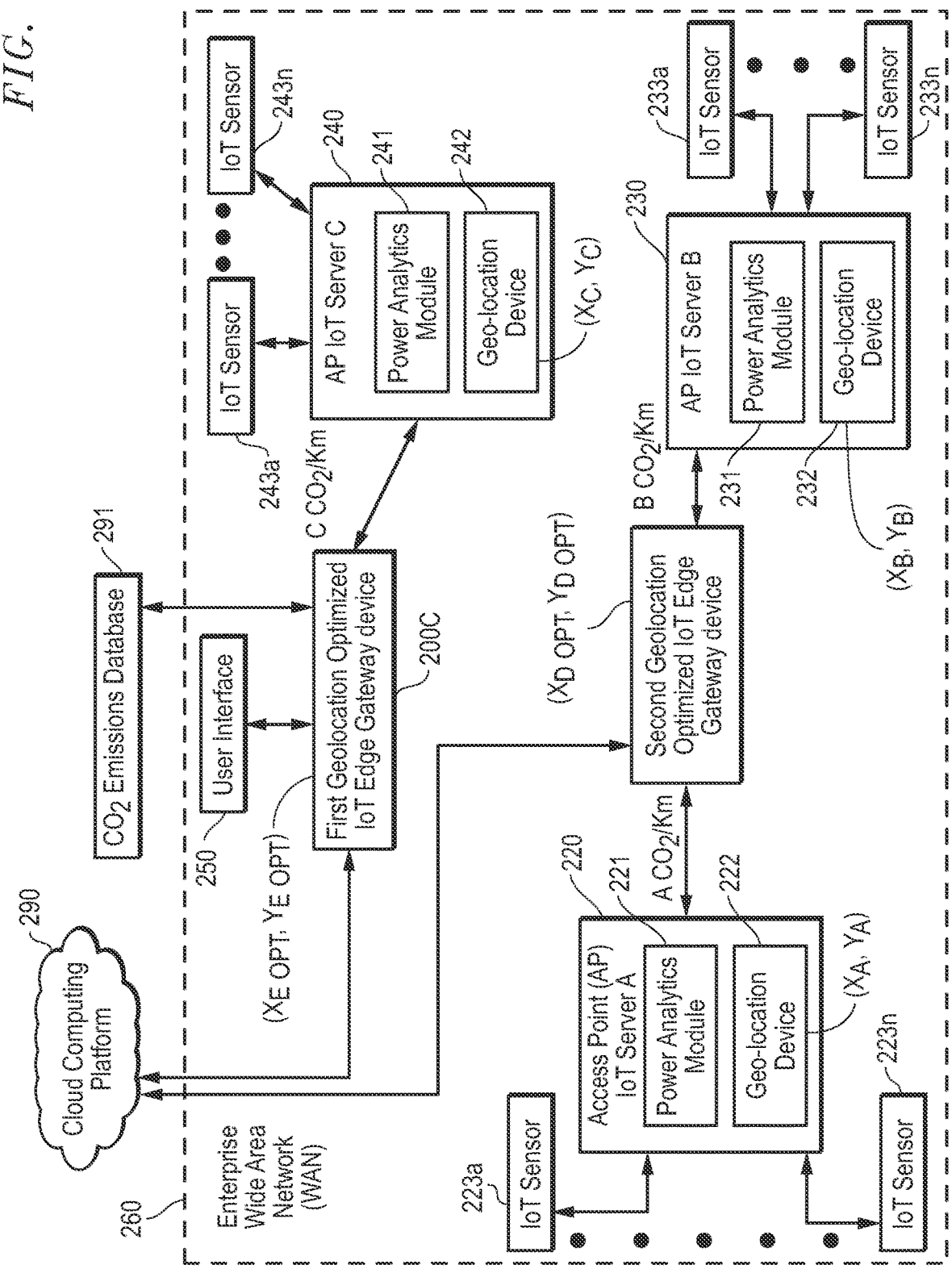
FIG. 2C is a block diagram illustrating a second IoT edge gateway device located at a second optimized geographic location for transceiving IoT data with AP IoT servers that are causing an increase in total CO2 emissions according to an embodiment of the present disclosure.

The IoT edge gateway device hardware processor executing code instructions of the IoT edge gateway device location optimization and CO2 minimization system in such an embodiment may then determine whether adjusting the location of the geolocation optimized IoT edge gateway device 200B or adding a second IoT edge gateway device 205, as shown in FIG. 2C, at a second optimized geographic location in the enterprise WAN 260 is more likely to minimize total CO2 emissions during IoT data transfer among the plurality of AP IoT servers 220, 230, and 240 and the one or more IoT edge gateway devices (e.g., 200B). This determination may be made based on updated determinations (e.g., $A_{updated}$, $B_{updated}$, and $C_{updated}$) of CO2 emissions per unit of distance for each of the plurality of AP IoT servers 220, 230, and 240, geographic locations (e.g., ($X_A$, $Y_A$), ($X_B$, $Y_B$), and ($X_C$, $Y_C$), respectively) of those AP IoT servers 220, 230, 240, and the current optimal geographic location ($X_{EOPT}$, $Y_{EOPT}$) for the geolocation optimized IoT edge gateway device 200B. For example, because the AP IoT server 220 has been identified as a potential cause for the increase in Total CO2 emissions, as described above, and because the AP IoT server 220 may be located within the same enterprise facility as AP IoT server 230, the hardware processor of the geolocation optimized IoT edge gateway device 200B in an embodiment may execute code instructions of the IoT edge gateway device location optimization and CO2 minimization system 280 to determine whether placing a second IoT edge gateway device 250 in FIG. 2C in close proximity to the AP IoT servers 220 and 230 may result in a lower total CO2 emissions value than moving the current geolocation optimized IoT edge gateway device 200B to a new geographic location to minimize CO2 emissions based upon the updated CO2 emissions per unit of distance for each of the plurality of AP IoT servers 220, 230, and 240. More specifically, the hardware processor executing code instructions of the IoT edge gateway device location optimization and CO2 minimization system 280 in an embodiment may use the above updated power and data information, such as in execution of code instructions for an algorithmic equation (3) to determine a total CO2 emissions value (Total CO2D) for transfer of IoT data between a hypothetical second IoT edge gateway device 205 of FIG. 2C and the AP IoT servers 220 and 230 at an enterprise facility based on the updated CO2 emissions per unit of distance (e.g., $A_{updated}$, $B_{updated}$, and $C_{updated}$) and the geographic locations of the AP IoT servers 220 and 230 (e.g., ($X_A$, $Y_A$), and ($X_B$, $Y_B$)):

$$\text{Total CO}_2^D = \sqrt{\left[X_D - \left(\frac{A^2 X_A + B^2 X_B}{A^2 + B^2}\right)\right]^2 + \left[Y_D - \left(\frac{A^2 Y_A + B^2 Y_B}{A^2 + B^2}\right)\right]^2} \quad (3)$$

The hardware processor of the geolocation optimized IoT edge gateway device 200B in an embodiment may execute code instructions of the IoT edge gateway device location optimization and CO2 minimization system 280 to then determine a total CO2 (Total $CO_2^{EtoC}$) emitted during transfer of IoT data from the AP IoT server 240 alone to the geolocation optimized IoT edge gateway device 200B operating at the optimal geographic location ($X_{EOPT}$, $Y_{EOPT}$) by executing code instructions for an algorithmic equation (4):

$$\text{Total CO}_2^{EtoC} = \sqrt{[X_E - X_C]^2 + [Y_E - Y_C]^2} \quad (4)$$

A full network value (Total $CO_2^{EandD}$) of CO2 emitted during the transfer of IoT data from AP IoT servers 220 and 230 to a hypothetical second geolocation optimized IoT edge gateway device 205 of FIG. 2C and the transfer of IoT data from AP IoT server 240 to geolocation optimized IoT edge gateway device 200B operating at the optimal geographic location ($X_{EOPT}$, $Y_{EOPT}$) may be determined by executing code instructions for an algorithmic equation (5):

$$\text{Total } CO_2^{E \, and \, D} = \text{Total } CO_2^D + \text{Total } CO_2^{E \to C} \quad (5)$$

The hardware processor of the geolocation optimized IoT edge gateway device 200B in an embodiment executing code instructions of the IoT edge gateway device location optimization and CO2 minimization system 280 may also determine an updated optimal geographic location for the geolocation optimized IoT edge gateway device 200B in the enterprise WAN 260, assuming each of the AP IoT servers 220, 230, and 240 remain operably connected to the geolocation optimized IoT edge gateway device 200B, rather than to a hypothetical second IoT edge gateway device. For example, the hardware processor of the geolocation optimized IoT edge gateway device 200B in an embodiment executing code instructions of the IoT edge gateway device location optimization and CO2 minimization system 280 may use the updated values (e.g., $A_{updated}$, $B_{updated}$, and $C_{updated}$) for CO2 emissions per unit of distance to determine an updated optimal geographic location for the geolocation optimized IoT edge gateway device 200B using the same method described above with respect to FIG. 2A. In addition, the hardware processor of the geolocation optimized IoT edge gateway device 200B in an embodiment executing code instructions of the IoT edge gateway device location optimization and CO2 minimization system 280 may also updated values (e.g., $A_{updated}$, $B_{updated}$, and $C_{updated}$) for CO2 emissions per unit of distance determine a total CO2 emissions value estimated to occur if the geolocation optimized IoT edge gateway device 200B is moved to this updated optimal geographic location. If the total CO2 emissions value estimated to occur if the geolocation optimized IoT edge gateway device 200B is moved to this updated optimal geographic location is greater than the full network value (Total $CO_2^{FundD}$) of CO2 estimated by the IoT edge gateway device location optimization and CO2 minimization system 280 to be emitted if a second geolocation optimized IoT edge gateway device is added, addition of the second geolocation optimized IoT edge gateway device may be warranted in an embodiment, as described in greater detail with respect to FIG. 2C.

FIG. 2C is a block diagram illustrating a second Internet of Things (IoT) edge gateway device information handling system 205 located at a second optimized geographic location for transceiving IoT data with one or more Access Point (AP) IoT servers identified as potentially causing an increase in total CO2 emissions according to an embodiment of the present disclosure. If the hardware processor of the first geolocation optimized IoT edge gateway device 200C executing code instructions of the IoT edge gateway device location optimization and CO2 minimization system 280 determines that moving the existing first geolocation optimized IoT edge gateway device 200C to an updated optimized geographic location (e.g., based on the updated values $A_{updated}$, $B_{updated}$, and $C_{updated}$) is most likely to minimize CO2 emissions, the hardware processor of the geolocation optimized IoT edge gateway device 200C may then transmit an instruction to the user interface 250 instructing the user of the first geolocation optimized IoT edge gateway device 200C to place the first geolocation optimized IoT edge gateway at the updated optimal geographic location as described for FIG. 2B above.

In another embodiment, if the hardware processor of the geolocation optimized IoT edge gateway device 200C executing code instructions of the IoT edge gateway device location optimization and CO2 minimization system 280 determines that adding a second IoT edge gateway device 205 to a second optimized geographic location ($X_{DOPT}$, $Y_{DOPT}$) in an enterprise WAN 260 is most likely to minimize CO2 emissions, the hardware processor of the geolocation optimized IoT edge gateway device 200C may then transmit an instruction to the user interface 250 for the user of the first geolocation optimized IoT edge gateway device 200C and the second geolocation optimized IoT edge gateway device 205 to place the second geolocation optimized IoT edge gateway device 205 at the second optimal geographic location ($X_{DOPT}$, $Y_{DOPT}$) and to reroute IoT data transfer from AP IoT servers 220 and 230 away from the first geolocation optimized IoT edge gateway device 200C to the second geolocation optimized IoT edge gateway device 205 in the enterprise WAN 260. In such a way, a hardware processor of the first geolocation optimized IoT edge gateways 200C and second optimized IoT edge gateway device 205 executing code instructions of the IoT edge gateway device location optimization and CO2 minimization system 280 may adjust the location(s) of either the first IoT edge gateway device 200C or add a new IoT edge gateway device 205) with respect to a plurality of operably connected AP IoT servers 220, 230, and 240 to minimize power consumed and CO2 emitted during transceiving of IoT data between the plurality of AP IoT servers 220, 230, and 240 and the first and second geolocation optimized IoT edge gateway device or devices 200C and 205 in the enterprise WAN 260.

FIG. 3 is a graphical illustration of a plot of CO2 emissions as a function of the geographic location of an Internet of Things (IoT) edge gateway device executing code instructions of the IoT edge gateway device location optimization and CO2 minimization system 280 to identify an optimal geographic location for the IoT edge gateway device in an enterprise WAN 260 to minimize CO2 emissions according to an embodiment of the present disclosure. As described herein, because IoT data transfer between some Access Point (AP) IoT servers and the IoT edge gateway device in the enterprise WAN 260 may result in higher CO2 emissions per unit of distance than IoT data transfers between the IoT edge gateway device and other AP IoT servers, moving the IoT edge gateway device closer to some of the AP IoT servers associated with higher CO2 emissions per unit of distance may decrease overall CO2 emissions during IoT data transfers from all of the AP IoT servers to the IoT edge gateway device in the enterprise WAN 260. For example, the hardware processor of the IoT edge gateway device, as described in greater detail above with respect to FIG. 2A, may execute code instructions of the IoT edge device location optimization and CO2 minimization system 280 to determine the total CO2 emitted as a function of the determined CO2 emissions per unit of distance measurements, geographic locations for each of the operably connected AP IoT servers, and geographic location ($X_E$, $Y_E$) of the IoT edge gateway device in the enterprise WAN 260.

The hardware processor of the IoT edge gateway device in an embodiment may execute code instructions of the IoT edge gateway device location optimization and CO2 minimization system 280 to then plot the total CO2 determined as a function of the geographic location ($X_E$, $Y_E$) of the IoT edge gateway device in the enterprise WAN 260. For example, the hardware processor may generate plot 300 to identify an optimal geographic location ($X_{EOPT}$, $Y_{EOPT}$) for the IoT edge gateway device at which the total CO2 is minimized. This process may also be repeated, as described in greater detail with respect to FIG. 2B to determine an updated optimal geographic location for the IoT edge gateway device or an optimal geographic location for a second IoT edge gateway device. Such a plot in FIG. 3 may be viewed and used by a user to select a new location via a graphical user interface (GUI) (e.g., 250) in some embodiments.

Figure 4:
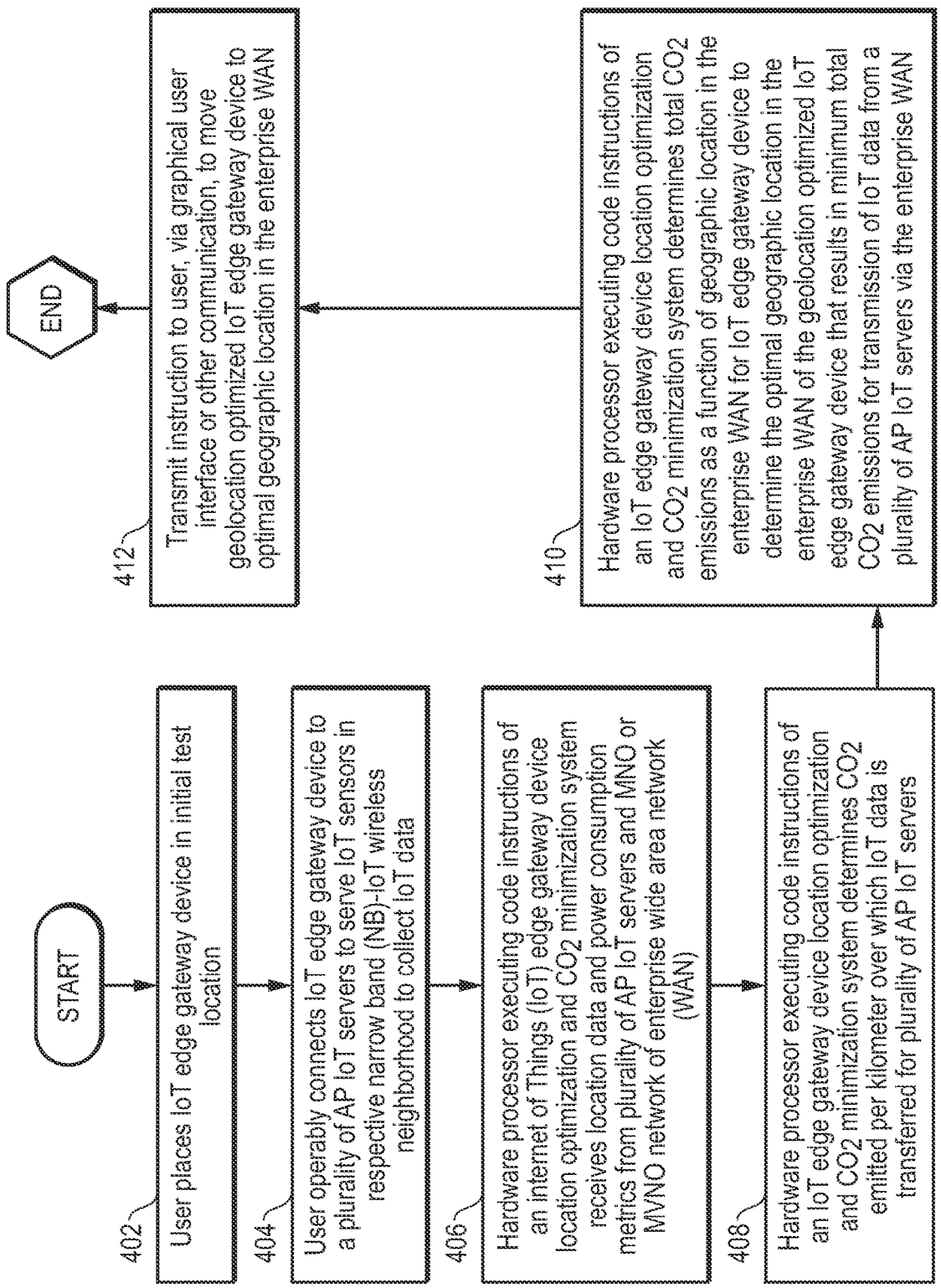
FIG. 4 is a flow diagram illustrating a method of determining an optimal geographic location for placement of an IoT edge gateway device relative to locations of a plurality of AP IoT servers to minimize CO2 emissions according to an embodiment of the present disclosure.

FIG. 4 is a flow diagram illustrating a method of determining an optimal geographic location for placement of an Internet of Things (IoT) edge gateway device in an enterprise WAN to minimize carbon dioxide (CO2) emissions due to transfer of IoT data among a plurality of Access Point (AP) IoT servers collecting IoT data from IoT sensors, such as with an NB-IoT wireless neighborhood and the IoT edge gateway device according to an embodiment of the present disclosure. As described herein, CO2 emitted during IoT data transmission via connections between AP IoT servers and an IoT edge gateway information handling system may be dependent upon power consumed by those AP IoT servers and the enterprise WAN during such IoT data transmission. The amount of power consumed during such transmission by any one of the AP IoT servers and the enterprise WAN may be dependent on the IoT data transfer rates (Gb/s) within Quality of Service (QOS) requirements for each of the AP IoT servers, the geographic locations of the AP IoT servers in the enterprise WAN, the volume of IoT data transmitted, and the IoT edge gateway device (e.g., distances between them). A hardware processor of the IoT edge gateway device information handling system executes code instructions of the IoT edge gateway device location optimization and CO2 minimization system in an embodiment to determine an optimal geographic location for the IoT edge gateway device with respect to the plurality of AP IoT servers in the enterprise WAN so as to minimize power consumed and CO2 emitted during transceiving of IoT data between the plurality of AP IoT servers having NB-IoT linked IoT sensor systems and the IoT edge gateway device information handling system.

At block 402, a user may place an IoT edge gateway device information handling system in an initial test location in the enterprise WAN administered by an enterprise to gather IoT sensor data and transmit it to a cloud application in an embodiment. For example, in an embodiment described with reference to FIG. 2A, a user of the IoT edge gateway device 200A may place the IoT edge gateway device 200A at an initial geographic location having coordinates ($X_{Einitial}$, and $Y_{Einitial}$) in the enterprise WAN 260. These coordinates may be GPS coordinates or latitude and longitude and be relative to other hardware in the enterprise WAN 260 such that placement or location is near enterprise hardware facilities in various embodiments. In other words, GPS locations are unlikely to be relevant along transmission lines or over wireless links but instead at locations of enterprise hardware facilities for the enterprise controlled WAN when determining placement locations for the IoT edge gateway device information handling system 200A in various embodiments herein.

The user of the IoT edge gateway device information handling system 200A in an embodiment at block 404 may operably connect the IoT edge gateway device information handling system 200A to a plurality of AP IoT servers in the enterprise WAN 260. For example, in an embodiment, the user of the IoT edge gateway device information handling system 200A may operably connect the IoT edge gateway device information handling system 200A at the initial geographic location ($X_{Einitial}$, $Y_{Einitial}$) to each of the plurality of AP IoT servers 220, 230, and 240 via wired or wireless connections in the enterprise WAN 260.

At block 406, a hardware processor of the IoT edge gateway device information handling system in an embodiment may execute code instructions of an IoT edge gateway device location optimization and CO2 minimization system to receive location data and power consumption metrics from the plurality of operably coupled AP IoT servers in the enterprise WAN. In an initial matter, location data may include current location of an IoT edge gateway device location as well as locations of hardware sites within an enterprise controlled WAN where optional alternative locations may be used to move the IoT edge gateway device to a new optimal location in the enterprise WAN for CO2 minimization. The IoT edge gateway device location optimization and CO2 minimization system may receive data from an enterprise WAN hardware site database or map indicating location of site hardware locations within the enterprise WAN that may be candidates for locations of the IoT edge gateway device. The location optimization conducted by IoT edge gateway device location optimization and CO2 minimization system will be in reference to the known site locations for enterprise WAN hardware as locations along transmission lines or between wireless transmitters would not be economically feasible in many instances. Thus, over a monitoring period, a hardware processor of the IoT edge gateway device information handling system 200A may execute code instructions of the IoT edge gateway device location optimization and CO2 minimization system 280 to gather power consumption metrics (e.g., in kWh), and IoT data transfer volumes (e.g., in Gb) for each of the AP IoT servers 220, 230, and 240. The IoT edge gateway device location optimization and CO2 minimization system 280 may further determine a geographic location ($X_A$, $Y_A$) for AP IoT server A 220, a geographic location ($X_B$, $Y_B$) for AP IoT server B 230, and a geographic location ($X_C$, $Y_C$) for AP IoT server C 240 in the enterprise WAN 260.

Based on these gathered metrics, at block 408, a hardware processor of the geolocation IoT edge gateway device information handling system may execute code instructions of the IoT edge gateway device location optimization and CO2 minimization system in an embodiment to determine, for each of the operably connected AP IoT servers, an amount of CO2 emitted per unit of distance over which the IoT data is being transmitted via the enterprise WAN to the IoT edge gateway device information handling system. For example, a hardware processor of the IoT edge gateway device information handling system 200A may execute code instructions of the IoT edge gateway device location optimization and CO2 minimization system 280 in an embodiment to determine, for each of the operably connected AP IoT servers 220, 230, 240, an amount of CO2 emitted per unit of distance (e.g., km) over which the IoT data is being transmitted to the IoT edge gateway device 200A in the enterprise WAN 260. Such a determination may be made, in an embodiment, based on gathered power consumption analytics for the AP IoT servers 220, 230, 240 and the enterprise WAN 260 stages, hops, or links as well as, distance data between the AP IoT servers 220, 230, and 240, respectively and the IoT edge gateway device 200A. A measured amount of CO2 emitted per kWh of power consumed at each of the specific geographic locations of the AP IoT servers 220, 230, and 240, respectively may also be determined from power facilities providing power to each specific geographic location. The processor executing code instructions of the IoT edge gateway device location optimization and CO2 minimization system 280 in an embodiment may then determine the CO2 emitted per unit of distance over which IoT data is transferred from a given AP IoT server (e.g., 220, 230, or 240) to the IoT edge gateway device 200A in the enterprise WAN 260.

For example, a hardware processor of the IoT edge gateway device information handling system 200A may execute code instructions of the IoT edge gateway device location optimization and CO2 minimization system 280 to determine a value $A_{initial}$ of 0.15 kg CO2 emitted per unit of distance for the transfer of IoT data between the AP IoT server A 220 and the IoT edge gateway device 200A, a value $B_{initial}$ of 0.75 kg CO2 emitted per unit of distance for the transfer of IoT data between the AP IoT server B 230 and the IoT edge gateway device 200A, and a value $C_{initial}$ of 1.7 kg CO2 emitted per unit of distance for the transfer of IoT data between the AP IoT server C 240 and the IoT edge gateway device 200A.

At block 410, the hardware processor of the geolocation optimized IoT edge gateway device information handling system may execute code instructions of the IoT edge gateway device location optimization and CO2 minimization system to plot the total CO2 emissions as a function of the geographic location of IoT edge gateway device information handling system in the enterprise WAN. For example, in an embodiment, a hardware processor of the IoT edge gateway device information handling system 200A executing code instructions of the IoT edge gateway device location optimization and CO2 minimization system 280 may determine an optimal geographic location for the IoT edge gateway device information handling system 200A relative to enterprise WAN hardware site locations in the enterprise WAN 260 based on the CO2 emissions per unit of distance values (e.g., $A_{initial}$, $B_{initial}$, and $C_{initial}$) determined at block 408 for each of the AP IoT servers (e.g., 220, 230, and 240) and on the fixed geographic locations of each of these AP IoT servers (e.g., 220, 230, and 240) at enterprise facilities having an NB-IoT wireless neighborhood. More specifically, the hardware processor of the IoT edge gateway device 200A may execute code instructions of the IoT edge gateway device location optimization and CO2 minimization system 280 to determine the total estimated CO2 emitted as a function of the determined CO2 emissions per unit of distance measurements, such as A or $A_{initial}$, B or $B_{initial}$, and C or $C_{initial}$, respectively and candidate geographic locations (e.g., $(X_A, Y_A)$, $(X_B, Y_B)$, and $(X_C, Y_C)$) relative to enterprise WAN hardware sites, respectively for each of the AP IoT servers 220, 230, and 240 in the enterprise WAN 260.

The hardware processor of the IoT edge gateway device information handling system 200A in an embodiment may then plot the total estimated CO2 as a function of the potential geographic locations $(X_E, Y_E)$ of the IoT edge gateway device information handling system 200A to identify an optimal geographic location for the IoT edge gateway device information handling system 200A $(X_{EOPT}, Y_{EOPT})$ in the enterprise WAN 260, at a enterprise WAN hardware site, at which the determined or estimated total CO2 is minimized among the AP IoT servers 220, 230, 240. In another example embodiment described with respect to FIG. 3, the hardware processor of the IoT edge gateway device information handling system executing code instructions of the IoT edge gateway device location optimization and CO2 minimization system may generate plot 300 to identify an optimal geographic locations $(X_{EOPT}, Y_{EOPT})$ for the IoT edge gateway device at which the total estimated CO2 is minimized in the enterprise WAN 260 and transmit the same for viewing by a user at a GUI. Such a GUI may indicate locations of WAN hardware sites within the enterprise controlled WAN in some embodiments.

The hardware processor of the IoT edge gateway device in an embodiment at block 412 may then transmit an instruction to a user interface for display to a user of the IoT edge gateway device to place the IoT edge gateway device information handling system at the optimal geographic location at which the total CO2 is minimized. For example, in an embodiment described with reference to FIG. 2A, the hardware processor of the IoT edge gateway device information handling system 200A in an embodiment may then transmit an instruction to a user interface 250 for display to a user of the IoT edge gateway device 200A or at an alternative terminal to place the IoT edge gateway device information handling system 200A at the optimal geographic location $(X_{EOPT}, Y_{EOPT})$ at which the determined or estimated total CO2 is minimized in the enterprise WAN 260. In such a way, the hardware processor of the IoT edge gateway device information handling system 200A may execute code instructions of the IoT edge gateway device location optimization and CO2 minimization system 280 to adjust the location of the IoT edge gateway device information handling system 200A with respect to a plurality of operably connected AP IoT servers 220, 230, 240 in the enterprise WAN 260 to minimize power consumed and CO2 emitted during transceiving of IoT data between the plurality of AP IoT servers 220, 230, 240, and the IoT edge gateway device information handling system 200A to transfer IoT data to backend cloud applications (e.g., 290) for an enterprise. The method for determining an optimal geographic location for placement of an IoT edge gateway device information handling system in the enterprise WAN to minimize CO2 emissions due to transfer of IoT data among a plurality of operably connected AP IoT servers may then end.

Figure 5:
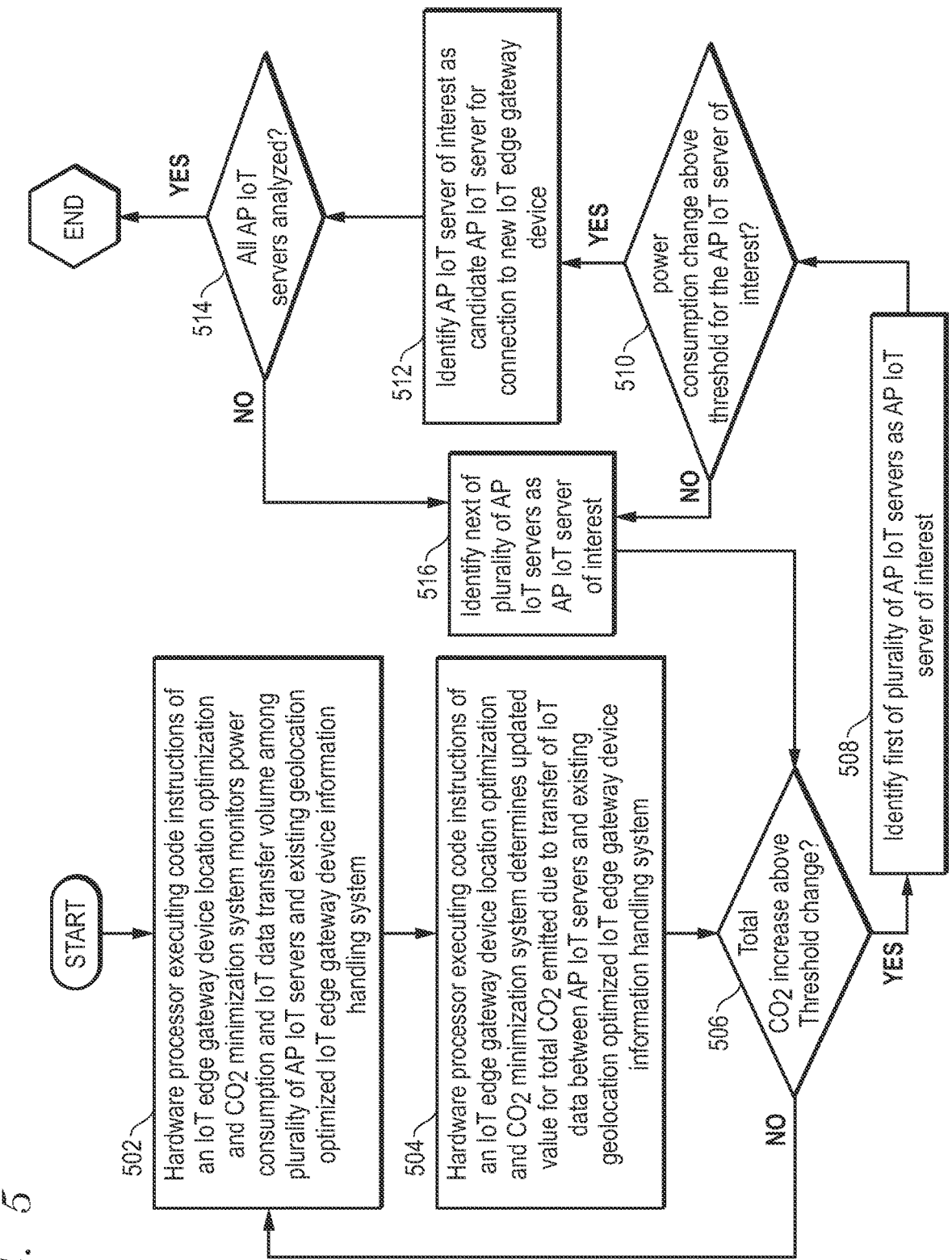
FIG. 5 is a flow diagram illustrating a method of identifying one or more AP IoT servers operably connected to an IoT edge gateway device potentially causing a detected increase in total CO2 emissions according to an embodiment of the present disclosure.

FIG. 5 is a flow diagram illustrating a method of identifying one or more Access Point (AP) Internet of Things (IoT) servers operably connected in an enterprise WAN to an IoT edge gateway device information handling system operating at a previously optimized geographic location potentially causing an increase in total CO2 emissions above a user-specified or policy threshold according to an embodiment of the present disclosure. As described herein, upon receipt of the optimal geographic location at which the total CO2 is minimized at the user interface, the user may physically move the IoT edge gateway device information handling system in the enterprise WAN to the optimal geographic location. The AP IoT servers may then be operably connected to the IoT edge gateway device information handling system in the enterprise WAN, which then may continue to monitor IoT data transfer volumes and power consumption metrics from the plurality of AP IoT servers and enterprise WAN stages or hops to identify whether repositioning of the IoT edge gateway device information handling system may be appropriate, as IoT data transfer volumes for one or more of the AP IoT servers varies over time with added sensors or changes in operation of an enterprise. In other cases, it may be more appropriate to add another, second IoT edge gateway device information handling system in the enterprise WAN of AP IoT servers in order to minimize total CO2 emissions across the network of AP IoT servers gathering NB-IoT data at enterprise facilities.

At block 502, in an embodiment, a hardware processor of the geolocation optimized IoT edge gateway device information handling system may execute code instructions of the IoT edge gateway device location optimization and CO2 minimization system to monitor power consumption and IoT data transfer volume among a plurality of AP IoT servers and the existing geolocation optimized IoT edge gateway device information handling system in the enterprise WAN. For example, in an embodiment described above with respect to FIG. 2B, following placement of the IoT edge gateway device information handling system 200B at the determined optimal geographic location ($X_{EOPT}$, $Y_{EOPT}$), the hardware processor of the geolocation optimized IoT edge gateway device information handling system 200B may execute code instructions of the IoT edge gateway device location optimization and CO2 minimization system 280 to monitor the total CO2 emissions resulting from power consumed during transfer of IoT data between or among each of the plurality of AP IoT servers 220, 230, and 240 and the geolocation optimized IoT edge gateway device information handling system 200B in the enterprise WAN 260.

The hardware processor for the geolocation optimized IoT edge gateway device information handling system in an embodiment at block 504 may execute code instructions of the IoT edge gateway device location optimization and CO2 minimization system to determine an updated value for total CO2 emitted due to transfer of IoT data between AP IoT servers and the existing geolocation optimized IoT edge gateway device information handling system in the enterprise WAN. These CO2 emissions values may increase or decrease over time as the amount of IoT data transferred, and thus power consumed during such transfer from any of the plurality of AP IoT servers either increases or decreases due to added sensors or changes in operation of an enterprise. For example, the hardware processor of the geolocation optimized IoT edge gateway device information handling system 200B may execute code instructions of the IoT edge gateway device location optimization and CO2 minimization system 280 to determine an updated amount $A_{updated}$ of 1.2 kg CO2 per km. The hardware processor of the geolocation optimized IoT edge gateway device information handling system 200B may execute code instructions of the IoT edge gateway device location optimization and CO2 minimization system 280 to perform a similar analysis to determine a value of $B_{updated}$ for the transfer of IoT data between the AP IoT server 230 and the geolocation optimized IoT edge gateway device information handling system 200B, and to determine a value of $C_{updated}$ for the transfer of IoT data between the AP IoT server 240 and the geolocation optimized IoT edge gateway device information handling system 200B. The hardware processor of the geolocation optimized IoT edge gateway device information handling system 200B may execute code instructions of the IoT edge gateway device location optimization and CO2 minimization system 280 in an embodiment to then determine a current or updated total CO2 emissions value, based on these updated values (e.g., $A_{updated}$, $B_{updated}$, and $C_{updated}$). This updated total CO2 emissions value may be compared to the total CO2 emissions value calculated for the initial values (e.g., $A_{initial}$, $B_{initial}$, and $C_{initial}$) by the IoT edge gateway device location optimization and CO2 minimization system 280 to determine an increase (or decrease in some embodiments) in the total CO2 emissions since placement of the geolocation optimized IoT edge gateway device information handling system 200B at the optimal geographic location ($X_{EOPT}$, $Y_{EOPT}$).

At block 506, the hardware processor of the geolocation optimized IoT edge gateway device information handling system in an embodiment may execute code instructions of the IoT edge gateway device location optimization and CO2 minimization system to determine whether the total CO2 has increased by more than a threshold value level since placement of the geolocation optimized IoT edge gateway device information handling system at the optimal geographic location in the enterprise WAN. As described herein, these CO2 emissions values may increase or decrease over time as the amount of IoT data transferred, and thus power consumed during such transfer from any of the plurality of AP IoT servers either increases or decreases. These changes may be based on added IoT sensors to N-IoT wireless neighborhoods or changes in operations at enterprise facilities linked by enterprise WAN. A user or an enterprise policy for of the geolocation optimized IoT edge gateway device information handling system in an embodiment may set a threshold value of CO2 emissions change at which relocation of the IoT edge gateway device information handling system or addition of a new IoT edge gateway device information handling system may be considered. For example, a user may set such a threshold value at a 5% increase, 10% increase, or 20% increase, but any percentage or CO2 estimated value may be used. Other embodiments contemplate any value between zero and one hundred percent. If the total CO2 emissions value has increased by an amount meeting or exceeding such a user-specified or policy-based CO2 increase threshold value since placement of the geolocation optimized IoT edge gateway device information handling system at the optimal geographic location in the enterprise WAN, the method may proceed to block 508 for identification of a potential cause for such an increase. If the total CO2 emissions value has not increased by an amount meeting or exceeding such a user-specified or policy-based CO2 increase threshold value since placement of the geolocation optimized IoT edge gateway device information handling system at the optimal geographic location in the enterprise WAN, no changes to the number or location of geolocation optimized IoT edge gateway device information handling systems may be needed, and the method may proceed back to block 502 for routine monitoring of the power consumption and IoT data transfer metrics for the plurality of AP IoT servers operably connected to the geolocation optimized IoT edge gateway device information handling system in the enterprise WAN.

The hardware processor of the geolocation optimized IoT edge gateway device information handling system at block 508 in an embodiment in which the total CO2 has increased above a threshold value since placement of the geolocation optimized IoT edge gateway device information handling system at the previously optimal geographic location in the enterprise WAN may identify a first of a plurality of operably connected AP IoT servers as an AP IoT server of interest. For example, when the total CO2 emissions increases by a preset threshold value (e.g., 5%) since placement of the geolocation optimized IoT edge gateway device information handling system 200B at the optimal geographic location ($X_{EOPT}$, $Y_{EOPT}$), a hardware processor of the geolocation optimized IoT edge gateway device information handling system 200B executing code instructions of the IoT edge gateway device location optimization and CO2 minimization system 280 may select AP IoT server A 220 as the AP IoT server of interest. The hardware processor of the geolocation optimized IoT edge gateway device information handling system 200B executing code instructions of the IoT edge gateway device location optimization and CO2 minimization system may then analyze power consumption metrics for AP IoT server A 220 in the enterprise WAN 260 to determine whether it could possibly be a contributing cause to the detected increase in total CO2.

At block 510, the hardware processor of the geolocation optimized IoT edge gateway device information handling system executing code instructions of the IoT edge gateway device location optimization and CO2 minimization system in an embodiment may determine whether the power consumption associated with the AP IoT server of interest in the enterprise WAN is above a threshold value. For example, in an embodiment, the hardware processor of the geolocation optimized IoT edge gateway device information handling system 200B executing code instructions of the IoT edge gateway device location optimization and CO2 minimization system 280 may determine that AP IoT server A 220, whose IoT data transfer volumes have increased, has caused a resulting increase in power consumption from 100 kWh to 800 kWh. The hardware processor of the geolocation optimized IoT edge gateway device information handling system 200B executing code instructions of the IoT edge gateway device information handling system location optimization and CO2 minimization system 280 may identify this as a potential cause for the increase in total CO2 emissions across the enterprise WAN 260 for IoT data transfer if this change (e.g., 700 kWh or 800%) meets a user-specified or enterprise policy-based power-consumption or CO2 emissions increase threshold value. For example, the user may set this power-consumption increase or CO2 emissions increase threshold value at 50%, 100%, 200%, 500%, or 1000%. In an embodiment in which the user-specified or policy-based power-consumption increase threshold value or CO2 emissions increase threshold value is set to 500%, the hardware processor of the geolocation optimized IoT edge gateway device information handling system 200B executing code instructions of the IoT edge gateway device location optimization and CO2 minimization system 280 may determine the 800% increase in power consumption or CO2 emissions value by AP IoT server A 220 exceeds the power-consumption increase threshold value or the CO2 emissions increase threshold value. If the change in power consumption or CO2 emissions by the AP IoT server of interest does not exceed the user-specified or policy-based power-consumption increase threshold value or CO2 emissions increase threshold value, this may indicate that the AP IoT server of interest is not a likely contributing factor to the increase in total CO2 across the enterprise WAN for transfer of IoT data, and the method may proceed to block 516 for analysis of another AP IoT server. If the change in power consumption by the AP IoT server of interest does exceed the user-specified power-consumption increase threshold value, this may indicate that the AP IoT server of interest is a likely contributing factor to the increase in total CO2 across the enterprise WAN 260 for transfer of IoT data, and the method may proceed to block 512 for identification of the AP IoT server of interest as a candidate IoT device for connection to a new IoT edge gateway device information handling system 205.

The hardware processor of the geolocation optimized IoT edge gateway device information handling system 200B executing code instructions of the IoT edge gateway device location optimization and CO2 minimization system 280 in an embodiment at block 512 may identify the AP IoT server of interest as a candidate AP IoT server for connection a new IoT edge gateway device information handling system 205. As described herein, as IoT data transfer volumes and power consumption for one or more of the AP IoT servers increases, repositioning of the IoT edge gateway device information handling system, or addition of another IoT edge gateway device information handling system 205 for operable connection to one or more candidate AP IoT servers in the enterprise WAN 260 may be recommended in order to minimize total CO2 emissions across the enterprise WAN 260 of AP IoT servers. Selection between these methods is described in greater detail below with respect to FIG. 6. In such a way, the hardware processor of the geolocation optimized IoT edge gateway device information handling system 200B executing code instructions of the IoT edge gateway device location optimization and CO2 minimization system 280 may identify one or more AP IoT servers (220, 230, or 240) whose connection to an additional IoT edge gateway device information handling system 205 may optimally minimize CO2 emissions due to IoT data transfer in the enterprise WAN 260 across enterprise facilities for transfer to the cloud application 290.

At block 514, the hardware processor of the geolocation optimized IoT edge gateway device information handling system executing code instructions of the IoT edge gateway device location optimization and CO2 minimization system may determine whether each of the AP IoT servers operably connected to the geolocation optimized IoT edge gateway device information handling system have been analyzed as potential causes for the determined increase in CO2 emissions. For example, in an embodiment in which the AP IoT server A 220 has been identified at block 512 as an AP IoT server of interest, the hardware processor of the geolocation optimized IoT edge gateway device information handling system 200B executing code instructions of the IoT edge gateway device location optimization and CO2 minimization system 280 may determine that AP IoT server B 230 and AP IoT server C 240 have not yet been analyzed as potential causes for the increase in CO2 emissions determined at blocks 504 and 506. If AP IoT servers operably connected to the geolocation optimized IoT edge gateway device information handling system have not yet been analyzed in such a way, the method may proceed back to block 516 for identification of the next of the plurality of AP IoT servers as the AP IoT server of interest. If all of the AP IoT servers operably connected to the geolocation optimized IoT edge gateway device information handling system have been analyzed in such a way, the method for identifying one or more AP IoT servers operably connected to an IoT edge gateway device information handling system operating at a previously optimized geographic location that are potentially causing an increase in total CO2 emissions above a user-specified or policy-based threshold may then end.

The hardware processor of the geolocation optimized IoT edge gateway device information handling system executing code instructions of the IoT edge gateway device location optimization and CO2 minimization system in an embodiment at block 516 may identify the next of a plurality of AP IoT servers as the AP IoT server of interest. This may occur in an embodiment in which the power consumption of the AP IoT server of interest has not changed enough to meet the user-specified or policy-based power-consumption increase threshold value or CO2 emissions increase threshold value described at block 510, or in which other AP IoT servers have yet to be analyzed for such a threshold increase. For example, in an embodiment in which the power consumption for AP IoT server B 230 has not changed sufficiently to meet the user-specified or policy-based power-consumption increase threshold value or CO2 emissions increase threshold value at block 510, the hardware processor of the geolocation optimized IoT edge gateway device information handling system 200B executing code instructions of the IoT edge gateway device location optimization and CO2 minimization system 280 may identify AP IoT server C 240 as the next AP IoT server of interest. As another example in which the hardware processor of the geolocation optimized IoT edge gateway device information handling system 200B executing code instructions of the IoT edge gateway device location optimization and CO2 minimization system 280 determines at block 514 that AP IoT server B 230 has not yet been analyzed, the hardware processor of the geolocation optimized IoT edge gateway device information handling system 200B executing code instructions of the IoT edge gateway device location optimization and CO2 minimization system 280 may identify AP IoT server B 230 as the next AP IoT server of interest. The method may then proceed back to block 508. By repeating the loop between blocks 508 and 516 in such a manner, each of the AP IoT servers operably connected to the geolocation optimized IoT edge gateway device information handling system may be analyzed to determine whether their current power consumption values or CO2 emissions values may be a contributing factor to the increase in CO2 emissions across the enterprise WAN detected at blocks 504 and 506 above.

FIG. 6 is a flow diagram illustrating a method of determining a second optimal geographic location for placement of a second Internet of Things (IoT) edge gateway device information handling system in an enterprise WAN to minimize CO2 emissions due to transfer of IoT data from a plurality of Access Point (AP) IoT servers identified as potentially causing a detected increase in total CO2 emissions and the first IoT edge gateway device information handling system according to an embodiment of the present disclosure. As described herein, upon identifying one or more AP IoT servers as candidates for connection to new IoT edge gateway device information handling systems, as described in greater detail above with respect to FIG. 5, the IoT edge gateway device information handling system hardware processor executing code instructions of the IoT edge gateway device location optimization and CO2 minimization system in an embodiment may determine whether adjusting the location of the first geolocation optimized IoT edge gateway or adding a second IoT edge gateway device information handling system at a second optimized geographic location is more likely to minimize total CO2 emissions during IoT data transfer among the plurality of AP IoT servers and the one or more IoT edge gateway device information handling systems.

At block 602, the hardware processor of the geolocation optimized IoT edge gateway device information handling system executing code instructions of the IoT edge gateway device location optimization and CO2 minimization system in an embodiment may determine an updated optimal geographic location for the existing geolocation optimized gateway transceiving IoT data from the plurality of IoT devices and resulting CO2 emissions. For example, the hardware processor of the geolocation optimized IoT edge gateway device information handling system 200B in an embodiment executing code instructions of the IoT edge gateway device information handling system location optimization and CO2 minimization system 280 may determine an updated optimal geographic location at a hardware site in the enterprise WAN for the geolocation optimized IoT edge gateway device information handling system 200B, assuming each of the AP IoT servers 220, 230, and 240 remain operably connected to the geolocation optimized IoT edge gateway device information handling system 200B, rather than to a hypothetical second IoT edge gateway device information handling system (e.g., 205 of FIG. 2C). More specifically, the hardware processor of the geolocation optimized IoT edge gateway device information handling system 200B in an embodiment executing code instructions of the IoT edge gateway device location optimization and CO2 minimization system may use the updated values (e.g., $A_{updated}$, $B_{updated}$, and $C_{updated}$) determined above with respect to block 504 of FIG. 5 for CO2 emissions per unit of distance to determine an updated optimal geographic location for the geolocation optimized IoT edge gateway device information handling system 200B using the same method described above with respect to FIG. 2A and at block 410 of FIG. 4.

The hardware processor of the geolocation optimized IoT edge gateway device information handling system executing code instructions of the IoT edge gateway device location optimization and CO2 minimization system in an embodiment at block 604 may determine an updated CO2 emissions level for an enterprise WAN including the first geolocation optimized IoT edge gateway device operating at the updated optimal geographic location. For example, the hardware processor of the geolocation optimized IoT edge gateway device information handling system 200B in an embodiment executing code instructions of the IoT edge gateway device location optimization and CO2 minimization system may perform steps similar to block 410 of FIG. 4 above to determine a total CO2 emissions value for the enterprise WAN 260 estimated to occur if the geolocation optimized IoT edge gateway device information handling system 200B is moved to the updated optimal geographic location determined above at block 602. Again, these locations may be at hardware sites for the enterprise controlled WAN as provided by access to an enterprise WAN site location database or map.

At block 606, the hardware processor of the geolocation optimized IoT edge gateway device information handling system executing code instructions of the IoT edge gateway device location optimization and CO2 minimization system in an embodiment may determine an alternative optimal geographic location for a second geolocation optimized IoT edge gateway device information handling system transceiving IoT data specifically with the identified candidate AP IoT servers. Again, locations for this second geolocation optimized IoT edge gateway device information handling system may be at hardware sites for the enterprise controlled WAN as provided by access to an enterprise WAN site location database or map. For example, the hardware processor of the geolocation optimized IoT edge gateway device information handling system 200C in an embodiment described with reference to FIG. 2C executing code instructions of the IoT edge gateway device information handling system location optimization and CO2 minimization system 280 may determine an updated optimal geographic location for a second geolocation optimized IoT edge gateway device information handling system 205 collecting IoT data from AP IoT servers 220, and 230, while AP IoT server 240 remains operably connected to the first geolocation optimized IoT edge gateway device information handling system 200B. More specifically, the hardware processor of the first geolocation optimized IoT edge gateway device information handling system 200C in an embodiment executing code instructions of the IoT edge gateway device location optimization and CO2 minimization system 280 may determine CO2 emissions per unit of distance being transmitted by AP IoT server A 220 and AP IoT server B 230 as above. Then the method may use the updated values (e.g., $A_{updated}$, and $B_{updated}$) determined above for CO2 emissions per unit of distance being transmitted by AP IoT server A 220 and AP IoT server B 230 with respect to block 504 of FIG. 5 for CO2 emissions per unit of distance being transmitted by AP IoT server A 220 and AP IoT server B 230 to apply to a candidate optimal locations to determine an optimal geographic location for the second geolocation optimized IoT edge gateway device information handling system 205 as it affects total estimated CO2 generation of IoT data transmissions across the enterprise WAN using the same method and systems described above.

The hardware processor of the geolocation optimized IoT edge gateway device information handling system executing code instructions of the IoT edge gateway device location optimization and CO2 minimization system in an embodiment at block 608 may determine an updated, estimated CO2 emissions level for an enterprise WAN including the first geolocation optimized IoT edge gateway device operating at the previous optimal geographic location and the second geolocation optimized IoT edge gateway device operating at the alternative optimal geographic location determined at block 606 to collect IoT data from the identified candidate AP IoT servers. For example, the hardware processor executing code instructions of the IoT edge gateway device location optimization and CO2 minimization system in an embodiment may determine a total estimated CO2 emissions value (Total CO2") for transfer of IoT data between a hypothetical second IoT edge gateway device information handling system 205 and the identified candidate AP IoT servers 220 and 230 based on the updated CO2 emissions per unit of distance (e.g., $A_{updated}$, $B_{updated}$) and the geographic locations of the AP IoT servers 220 and 230 (e.g., $(X_A, Y_A)$, and $(X_B, Y_B)$) and remaining AP IoT servers operating with the first IoT edge gateway device information handling system 200B at its location. A full network value (Total $CO_2^{EandD}$) of estimated CO2 emitted during the transfer of IoT data from AP IoT servers 220 and 230 to a hypothetical second geolocation optimized IoT edge gateway device information handling system 205 and the transfer of IoT data from AP IoT server 240 to geolocation optimized IoT edge gateway device information handling system 200B operating at the previous optimal geographic location $(X_{EOPT}, Y_{EOPT})$ may be determined using the same methods and systems described above The hardware processor of the geolocation optimized IoT edge gateway device information handling system executing code instructions of the IoT edge gateway device location optimization and CO2 minimization system in an embodiment at block 610 may determine whether relocation of the existing first IoT edge gateway device information handling system or addition of a second IoT edge gateway device information handling system results in a lower total estimated CO2 emissions due to transfer of IoT data from the AP IoT servers to their operably connected IoT edge gateway device information handling systems in the enterprise WAN. For example, the hardware processor of the geolocation first optimized IoT edge gateway device information handling system 200B executing code instructions of the IoT edge gateway device location optimization and CO2 minimization system 280 may determine if the total estimated CO2 emissions value estimated to occur if the geolocation optimized IoT edge gateway device information handling system 200B is moved to an updated optimal geographic location in the enterprise WAN 260 is greater than the full network value (Total $CO_2^{EandD}$) of CO2 estimated to be emitted if a second geolocation optimized IoT edge gateway device 205 is added to the enterprise WAN 260 for collection of IoT data from the AP IoT servers 220 and 230 identified as candidate AP IoT servers for connection to a second gateway device. If relocation of the existing first edge gateway device information handling system 200B results in a total CO2 emissions value, as determined at block 604, that is less than the full network value (Total $CO_2^{EandD}$) of CO2 estimated to be emitted if a second geolocation optimized IoT edge gateway device information handling system 205 is added in the enterprise WAN 260, the method may proceed to block 612 for transmission to the user interface to relocate the existing first geolocation optimized IoT edge gateway device information handling system 200B to an updated optimal geographic location to minimize CO2 emissions. If relocation of the existing first IoT edge gateway device information handling system 200B results in a total estimated CO2 emissions value in the enterprise WAN 260, as determined at block 604 that is greater than the full network value (Total $CO_2^{EandD}$) of CO2 estimated to be emitted if a second geolocation optimized IoT edge gateway device information handling system 205 is added in the enterprise WAN 260, addition of the second geolocation optimized IoT edge gateway device information handling system 205 may be transmitted, and the method may proceed to block 614.

At block 612, in an embodiment in which relocation of the existing first IoT edge gateway device information handling system 200B results in a total estimated CO2 emissions value, as determined at block 604 that is less than the full network value (Total $CO_2^{EandD}$) of CO2 estimated to be emitted if a second geolocation optimized IoT edge gateway device information handling system 205 is added in the enterprise WAN 260, the hardware processor of the first geolocation optimized IoT edge gateway device information handling system 200B executing code instructions of the IoT edge gateway device location optimization and CO2 minimization system 280 may transmit an instruction to the user to move the existing first geolocation optimized IoT edge gateway device information handling system 200B to the updated optimal geographic location. For example, in an embodiment described with reference to FIG. 2C, if the hardware processor of the geolocation optimized IoT edge gateway device information handling system 200C executing code instructions of the IoT edge gateway device location optimization and CO2 minimization system 280 determines that moving the existing first IoT edge gateway device information handling system 200C to an updated optimized geographic location (e.g., by using the updated values $A_{updated}$, $B_{updated}$, and $C_{updated}$) is most likely to minimize total CO2 emissions for IoT data transfers within the enterprise WAN 260, the hardware processor of the first geolocation optimized IoT edge gateway device information handling system 200C may then transmit an instruction to the user interface 250 instructing the user of the first geolocation optimized IoT edge gateway device information handling system 200C to place the first geolocation optimized IoT edge gateway device information handling system 200C at the updated optimal geographic location in the enterprise WAN 260. The method may then end.

Returning to block 612, in another embodiment, in which relocation of the existing first edge gateway device information handling system results in a total estimated CO2 emissions value, as determined at block 604, that is greater than the full network value (Total $CO_2^{EandD}$) of CO2 estimated to be emitted if a second geolocation optimized IoT edge gateway device information handling system is added in the enterprise WAN 260, the hardware processor of the first geolocation optimized IoT edge gateway device information handling system executing code instructions of the IoT edge gateway device location optimization and CO2 minimization system at block 614 may transmit an instruction to the user to add a second geolocation optimized IoT edge gateway at the alternative optimal geographic location. For example, if the hardware processor of the first geolocation optimized IoT edge gateway device information handling system 200C executing code instructions of the IoT edge gateway device location optimization and CO2 minimization system 280 determines that adding a second IoT edge gateway device information handling system 205 to a second optimized geographic location ($X_{DOPT}$, $Y_{DOPT}$) in the enterprise WAN 260 near an identified problem AP IoT server is most likely to minimize CO2 emissions, the hardware processor of the first geolocation optimized IoT edge gateway device information handling system 200C may then transmit an instruction to the user interface 250 for the user of the first geolocation optimized IoT edge gateway device information handling system 200C and the second geolocation optimized IoT edge gateway device information handling system 205 to place the second geolocation optimized IoT edge gateway device information handling system 205 at the second optimal geographic location ($X_{DOPT}$, $Y_{DOPT}$) in the enterprise WAN 260 near one or more problem AP IoT servers.

At block 616, the hardware processor of the first geolocation optimized IoT edge gateway device information handling system executing code instructions of the IoT edge gateway device location optimization and CO2 minimization system in an embodiment may transmit an instruction to the user to reroute the IoT data transmissions from the identified candidate AP IoT servers which have problem power consumption levels to the second geolocation optimized IoT edge gateway device information handling system in the enterprise WAN 260 for IoT data transfer in an embodiment. For example, the hardware processor of the first geolocation optimized IoT edge gateway device information handling system 200C may transmit an instruction to the user interface 250 for the user of the first geolocation optimized IoT edge gateway device information handling system 200C and the second geolocation optimized IoT edge gateway device information handling system 205 to reroute IoT data transfer from AP IoT servers 220 and 230 away from the first geolocation optimized IoT edge gateway device information handling system 200C to the second geolocation optimized IoT edge gateway device information handling system 205. In such a way, a hardware processor of the first geolocation optimized IoT edge gateways 200C and 205 executing code instructions of the IoT edge gateway device location optimization and CO2 minimization system 280 may adjust the location(s) of IoT edge gateway device information handling system(s) (e.g., 200C and 205) with respect to a plurality of operably connected AP IoT servers 220, 230, and 240 to minimize power consumed and CO2 emitted during transceiving of IoT data between the plurality of AP IoT servers 220, 230, and 240 and the IoT edge gateway device information handling systems 200C and 205 in the enterprise WAN 260 to cloud applications for an enterprise. The method for determining a second optimal geographic location for placement of a second IoT edge gateway device information handling system to minimize CO2 emissions due to transfer of IoT data from a plurality of AP IoT servers in NB-IoT wireless neighborhoods of IoT sensors identified as potentially causing a detected increase in total estimated CO2 emissions in the enterprise WAN and the second IoT edge gateway device information handling system may then end.

The blocks of the flow diagrams of FIGS. 4, 5, and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An Internet of Things (IoT) edge gateway device information handling system executing an IoT edge gateway device location optimization and carbon dioxide (CO2) minimization system comprising:
   a network interface device of a first IoT edge gateway device information handling system operating at a current location to receive operational telemetry measurements from a plurality of Access Point (AP) IoT servers transceiving IoT data with the first IoT edge gateway device information handling system within an enterprise wide area network (WAN) indicating operation generates a current CO2 emissions value to be above a CO2 increase threshold value, where the operational telemetry measurements include power consumption analytics, IoT data rates, and AP IoT server geographic locations for the plurality of AP IoT servers;
   a hardware processor executing code instructions of the IoT edge gateway device location optimization and CO2 minimization system to determine a first estimated CO2 emissions level for the enterprise WAN for moving the first IoT edge gateway device operating at the current location to a first optimal geographic location at a WAN hardware site location to reduce total CO2 emissions during IoT data transfer between the plurality of AP IoT servers and the first IoT edge gateway device in the enterprise WAN;
   the hardware processor executing code instructions to determine a second estimated CO2 emissions level for the enterprise WAN for adding a second IoT edge gateway device operating at a second optimal geographic location to reduce total CO2 emissions during IoT data transfer in the enterprise WAN; and the network interface device transmitting an instruction to a user of the first IoT edge gateway device information handling system to physically move the first IoT edge gateway device information handling system to the first optimal geographic location if the first estimated $CO_2$ emissions level is less than the second estimated $CO_2$ emissions level.

2. The IoT edge gateway device information handling system of claim 1 further comprising:
the hardware processor executing code instructions to further determine the first estimated $CO_2$ emissions level for the enterprise WAN with the first IoT edge gateway device operating at the first optimal geographic location based on $CO_2$ emitted per unit of distance determined for each of the plurality of AP IoT servers.

3. The IoT edge gateway device information handling system of claim 1 further comprising:
the hardware processor executing code instructions to further determine the second estimated $CO_2$ emissions level for the enterprise WAN with the second IoT edge gateway device operating at the second optimal geographic location based on $CO_2$ emitted per unit of distance determined for a first portion of the plurality of AP IoT servers to be operably coupled to the second IoT edge gateway device and $CO_2$ emitted per unit distance determined for a second, remaining portion of the plurality of AP IoT servers operably coupled to the first IoT edge gateway device information handling system operating at the current location.

4. The IoT edge gateway device information handling system of claim 1 further comprising:
the hardware processor executing code instructions to determine the first estimated $CO_2$ emissions level and second estimated $CO_2$ emissions level based on an amount of $CO_2$ emitted per kWh of power supplied to the plurality of AP IoT servers within the enterprise WAN.

5. The IoT edge gateway device information handling system of claim 1 further comprising:
the network interface device transmitting a user instruction to a user of the first IoT edge gateway device information handling system to operably connect the second IoT edge gateway device information handling system at the second optimal geographic location to a portion of the plurality of AP IoT servers if the first estimated $CO_2$ emissions level is greater than the second estimated $CO_2$ emissions level.

6. The IoT edge gateway device information handling system of claim 1, wherein the network interface device transceives IoT data with at least one of the plurality of AP IoT servers over a wired communication link.

7. Method of executing machine readable code instructions of an IoT edge gateway device location optimization and carbon dioxide ($CO_2$) minimization system at an Internet of Things (IoT) edge gateway device information handling system executing comprising:
receiving, via a network interface device of a first IoT edge gateway device information handling system operating at a current location, operational telemetry measurements from a plurality of Access Point (AP) IoT servers transceiving IoT data with the first IoT edge gateway device information handling system within an enterprise wide area network (WAN) indicating operation generates a current $CO_2$ emissions value to be above a $CO_2$ increase threshold value, where the operational telemetry measurements include power consumption analytics, IoT data rates, and AP IoT server geographic locations for the plurality of AP IoT servers;
executing code instructions of the IoT edge gateway device location optimization and $CO_2$ minimization system, via a hardware processor, to determine a first estimated $CO_2$ emissions level for the enterprise WAN for moving the first IoT edge gateway device operating at the current location to a first optimal geographic location at a WAN hardware site location to reduce total $CO_2$ emissions during IoT data transfer between the plurality of AP IoT servers and the first IoT edge gateway device in the enterprise WAN;
executing code instructions, via the hardware processor, to determine a second estimated $CO_2$ emissions level for the enterprise WAN for adding a second IoT edge gateway device operating at a second optimal geographic location to reduce total $CO_2$ emissions during IoT data transfer in the enterprise WAN; and
transmitting an instruction, via the network interface device, to a user of the first IoT edge gateway device information handling system to physically move the first IoT edge gateway device information handling system to the first optimal geographic location if the first estimated $CO_2$ emissions level is less than the second estimated $CO_2$ emissions level.

8. The method of claim 7 further comprising:
executing code instructions to further determine the first estimated $CO_2$ emissions level for the enterprise WAN with the first IoT edge gateway device operating at the first optimal geographic location based on $CO_2$ emitted per unit of distance determined for each of the plurality of AP IoT servers.

9. The method of claim 7 further comprising:
executing code instructions to further determine the second estimated $CO_2$ emissions level for the enterprise WAN with the second IoT edge gateway device operating at the second optimal geographic location based on $CO_2$ emitted per unit of distance determined for a first portion of the plurality of AP IoT servers to be operably coupled to the second IoT edge gateway device and $CO_2$ emitted per unit distance determined for a second, remaining portion of the plurality of AP IoT servers operably coupled to the first IoT edge gateway device information handling system operating at the current location.

10. The method of claim 7 further comprising:
executing code instructions to determine the first estimated $CO_2$ emissions level and second estimated $CO_2$ emissions level based on an amount of $CO_2$ emitted per kWh of power supplied to the plurality of AP IoT servers within the enterprise WAN.

11. The method of claim 7 further comprising:
transmitting, via the network interface device, a user instruction to a user of the first IoT edge gateway device information handling system to operably connect the second IoT edge gateway device information handling system at the second optimal geographic location to a portion of the plurality of AP IoT servers if the first estimated $CO_2$ emissions level is greater than the second estimated $CO_2$ emissions level.

12. The method of claim 7 further comprising:
transmitting an instruction, via the network interface device, to a user of the first IoT edge gateway device information handling system to physically move the first IoT edge gateway device information handling system to the first optimal geographic location if the first estimated CO2 emissions level is less than the second estimated CO2 emissions level.

13. The IoT edge gateway device information handling system of claim 7, wherein the network interface device transceives IoT data with at least one of the plurality of AP IoT servers over a wired communication link.

14. An Internet of Things (IoT) edge gateway device information handling system executing an IoT edge gateway device location optimization and carbon dioxide (CO2) minimization system comprising:
   a network interface device of a first IoT edge gateway device information handling system operating at a current location to receive operational telemetry measurements from a plurality of Access Point (AP) IoT servers transceiving IoT data with the first IoT edge gateway device information handling system within an enterprise wide area network (WAN) indicating operation generates a current CO2 emissions value to be above a CO2 increase threshold value, where the operational telemetry measurements include power consumption analytics, IoT data rates, and AP IoT server geographic locations for the plurality of AP IoT servers, wherein the plurality of AP IoT servers serve NB-IoT wireless neighborhoods located at a plurality of enterprise facilities connected via the enterprise WAN administered by an enterprise to transfer IoT data;
   a hardware processor executing code instructions of the IoT edge gateway device location optimization and CO2 minimization system to determine a first estimated CO2 emissions level for the enterprise WAN for moving the first IoT edge gateway device operating at the current location to a first optimal geographic location at a WAN hardware site location to reduce total CO2 emissions during IoT data transfer between the plurality of AP IoT servers and the first IoT edge gateway device in the enterprise WAN;
   the hardware processor executing code instructions to determine a second estimated CO2 emissions level for the enterprise WAN for adding a second IoT edge gateway device operating at a second optimal geographic location to reduce total CO2 emissions during IoT data transfer in the enterprise WAN; and
   transmitting an instruction, via the network interface device, to a user of the first IoT edge gateway device information handling system to physically move the first IoT edge gateway device information handling system to the first optimal geographic location if the first estimated CO2 emissions level is less than the second estimated CO2 emissions level.

15. The IoT edge gateway device information handling system of claim 14 further comprising:
   the hardware processor executing code instructions to further determine the first estimated CO2 emissions level for the enterprise WAN with the first IoT edge gateway device operating at the first optimal geographic location based on CO2 emitted per unit of distance determined for each of the plurality of AP IoT servers.

16. The IoT edge gateway device information handling system of claim 14 further comprising:
   the hardware processor executing code instructions to further determine the second estimated CO2 emissions level for the enterprise WAN with the second IoT edge gateway device operating at the second optimal geographic location based on CO2 emitted per unit of distance determined for a first portion of the plurality of AP IoT servers to be operably coupled to the second IoT edge gateway device and CO2 emitted per unit distance determined for a second, remaining portion of the plurality of AP IoT servers operably coupled to the first IoT edge gateway device information handling system operating at the current location.

17. The IoT edge gateway device information handling system of claim 14 further comprising:
   the hardware processor executing code instructions to determine the first estimated CO2 emissions level and second estimated CO2 emissions level based on an amount of CO2 emitted per kWh of power supplied to the plurality of AP IoT servers within the enterprise WAN.

18. The IoT edge gateway device information handling system of claim 14 further comprising:
   the network interface device transmitting a user instruction to a user of the first IoT edge gateway device information handling system to operably connect the second IoT edge gateway device information handling system at the second optimal geographic location to a portion of the plurality of AP IoT servers if the first estimated CO2 emissions level is greater than the second estimated CO2 emissions level.

19. The IoT edge gateway device information handling system of claim 14 further comprising:
   the network interface device transmitting an instruction to a user of the first IoT edge gateway device information handling system to physically move the first IoT edge gateway device information handling system to the first optimal geographic location if the first estimated CO2 emissions level is less than the second estimated CO2 emissions level.

20. The IoT edge gateway device information handling system of claim 14, wherein the network interface device transceives IoT data with at least one of the plurality of AP IoT servers over a wired communication link.

* * * * *